United States Patent
Kawanaka et al.

(10) Patent No.: US 11,946,554 B2
(45) Date of Patent: Apr. 2, 2024

(54) FLUID CONTACT MEMBER AND METHOD OF MANUFACTURING FLUID CONTACT MEMBER

(71) Applicant: HITACHI-GE NUCLEAR ENERGY, LTD., Hitachi (JP)

(72) Inventors: Hirotsugu Kawanaka, Tokyo (JP); Yoshihisa Kiyotoki, Hitachi (JP); Sei Hirano, Hitachi (JP); Daisuke Hirasawa, Hitachi (JP); Junya Kaneda, Hitachi (JP)

(73) Assignee: HITACHI-GE NUCLEAR ENERGY, LTD., Hitachi (JP)

( * ) Notice: Subject to any disclaimer, the term of this patent is extended or adjusted under 35 U.S.C. 154(b) by 407 days.

(21) Appl. No.: 17/311,726

(22) PCT Filed: Nov. 6, 2019

(86) PCT No.: PCT/JP2019/043433
§ 371 (c)(1),
(2) Date: Jun. 8, 2021

(87) PCT Pub. No.: WO2020/144924
PCT Pub. Date: Jul. 16, 2020

(65) Prior Publication Data
US 2022/0025984 A1  Jan. 27, 2022

(30) Foreign Application Priority Data
Jan. 8, 2019 (JP) ................. 2019-001434

(51) Int. Cl.
| | |
|---|---|
| *C22C 19/07* | (2006.01) |
| *B22F 10/64* | (2021.01) |
| *B33Y 40/20* | (2020.01) |
| *B33Y 80/00* | (2015.01) |
| *C22F 1/10* | (2006.01) |
| *F16K 25/04* | (2006.01) |

(Continued)

(52) U.S. Cl.
CPC .............. *F16K 25/04* (2013.01); *B22F 10/64* (2021.01); *B33Y 40/20* (2020.01); *B33Y 80/00* (2014.12);
(Continued)

(58) Field of Classification Search
CPC ..... C22C 1/0433; C22C 19/07; F16K 25/005; F16K 25/04; B33Y 40/20; B33Y 80/00;
(Continued)

(56) References Cited

U.S. PATENT DOCUMENTS 9,522,426 B2 * 12/2016 Das .................... G01J 5/004
10,632,535 B2 * 4/2020 Imano .................. B22F 3/24
(Continued)

FOREIGN PATENT DOCUMENTS

CN  107876762 A * 4/2018 ............ B22F 3/1055
EP  0 296 8614 A1  12/1988
(Continued)

OTHER PUBLICATIONS

Machine translation CN 107876762.*
(Continued)

*Primary Examiner* — Kevin F Murphy
(74) *Attorney, Agent, or Firm* — MATTINGLY & MALUR, PC

(57) ABSTRACT

To provide a fluid contact member whose corrosion resistance is particularly further improved than that in the related art. In order to solve this problem, a fluid contact member 10 includes a fluid contact portion 1 configured to be in contact with a fluid, the fluid contact portion 1 has a cobalt-based alloy phase 2 having a dendrite, and a compound phase 3 formed in an arm space of the dendrite and containing chromium carbide, and among a plurality of secondary arms 5 extending from one primary arm 4 constituting the dendrite, an average interval between adjacent secondary arms (Continued)

5 is 5 μm or less. At this time, the average interval is preferably 3 μm or less. Further, the compound phase 3 is preferably formed discontinuously in the dendrite arm space.

7 Claims, 14 Drawing Sheets

(51) Int. Cl.
*B22F 10/28* (2021.01)
*B33Y 10/00* (2015.01)
*F16K 3/30* (2006.01)

(52) U.S. Cl.
CPC .............. *C22C 19/07* (2013.01); *C22F 1/10* (2013.01); *B22F 10/28* (2021.01); *B22F 2301/15* (2013.01); *B33Y 10/00* (2014.12); *F16K 3/30* (2013.01)

(58) Field of Classification Search
CPC .......... B22F 10/25; B22F 10/36; B22F 10/64; C22F 1/10
See application file for complete search history.

(56) References Cited

U.S. PATENT DOCUMENTS

| | | |
|---|---|---|
| 2003/0132415 A1 | 7/2003 | Chigasaki et al. |
| 2014/0271317 A1 | 9/2014 | Nomura et al. |

FOREIGN PATENT DOCUMENTS

| | | |
|---|---|---|
| JP | 60-100642 A | 6/1985 |
| JP | 61-296979 A | 12/1986 |
| JP | 8-215842 A | 8/1996 |
| JP | 08-283894 A | 10/1996 |
| JP | 2000-273573 A | 10/2000 |
| JP | 2003-207059 A | 7/2003 |
| JP | 2014-1702 A | 1/2014 |
| WO | 2013058339 A1 | 4/2013 |

OTHER PUBLICATIONS

Extended European Search Report received in corresponding European Application No. 19909009.3 dated Jul. 25, 2022.

Yinping, D. et al., "Stellite Alloy Mixture Hardfacing via Laser Cladding for Control Valve Seat Sealing Surfaces", Surface and Coatings Technology, Sep. 9, 2017, pp. 97-108, vol. 329.

Wei, Y. et al., "Residual Stresses in Stellite 6 Layers Cladded on AISI 420 Steel Plates with a Nd:YAG Laser", Journal of Laser Applications, Laser Institute of America, Jul. 3, 2018, pp. 1-14, vol. 30, No. 3.

Lin, W.C. et al., "Characteristics of Thin Surface Layers of Cobalt-based Alloys Deposited by Laser Cladding", Surface and Coatings Technology, May 23, 2005, pp. 4557-4563, vol. 200.

International Search Report of PCT/JP2019/043433 dated Feb. 4, 2021.

* cited by examiner

[FIG. 1]
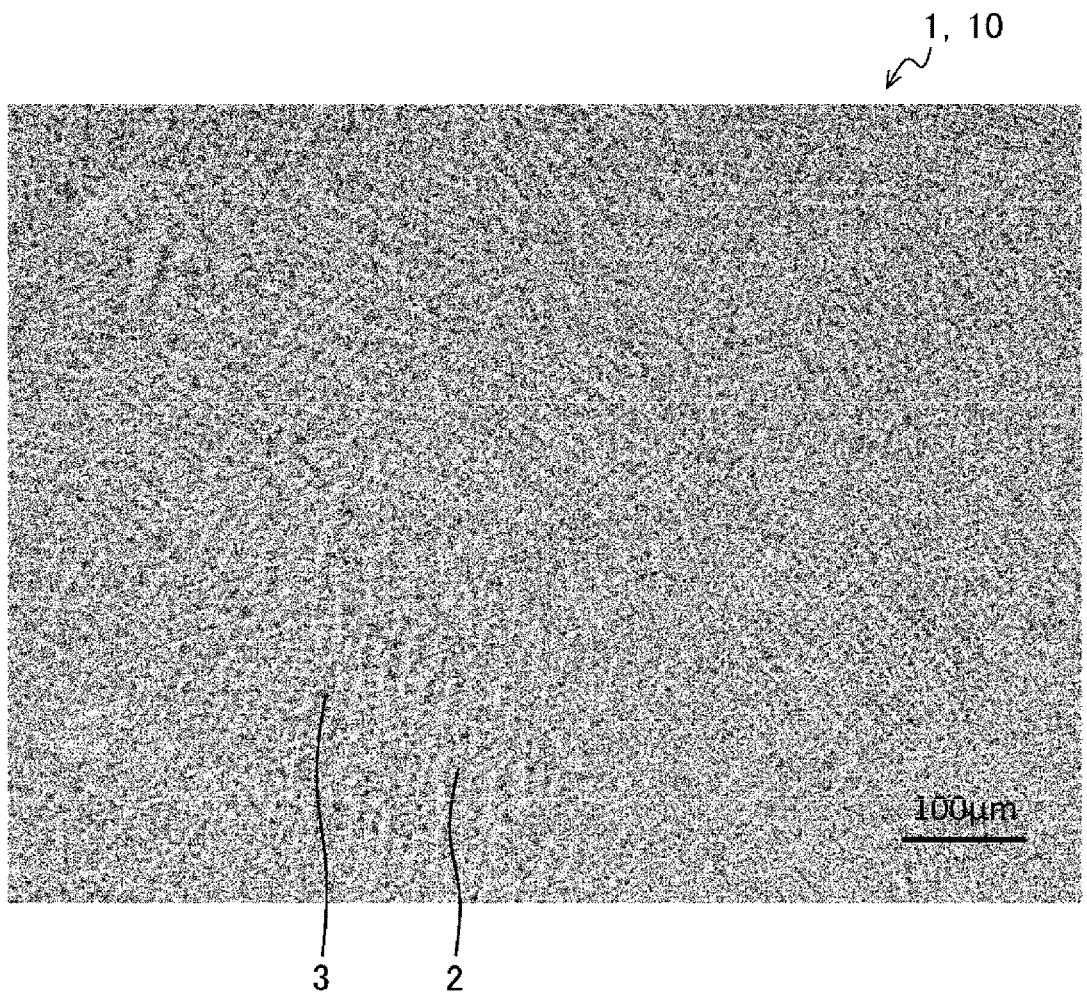

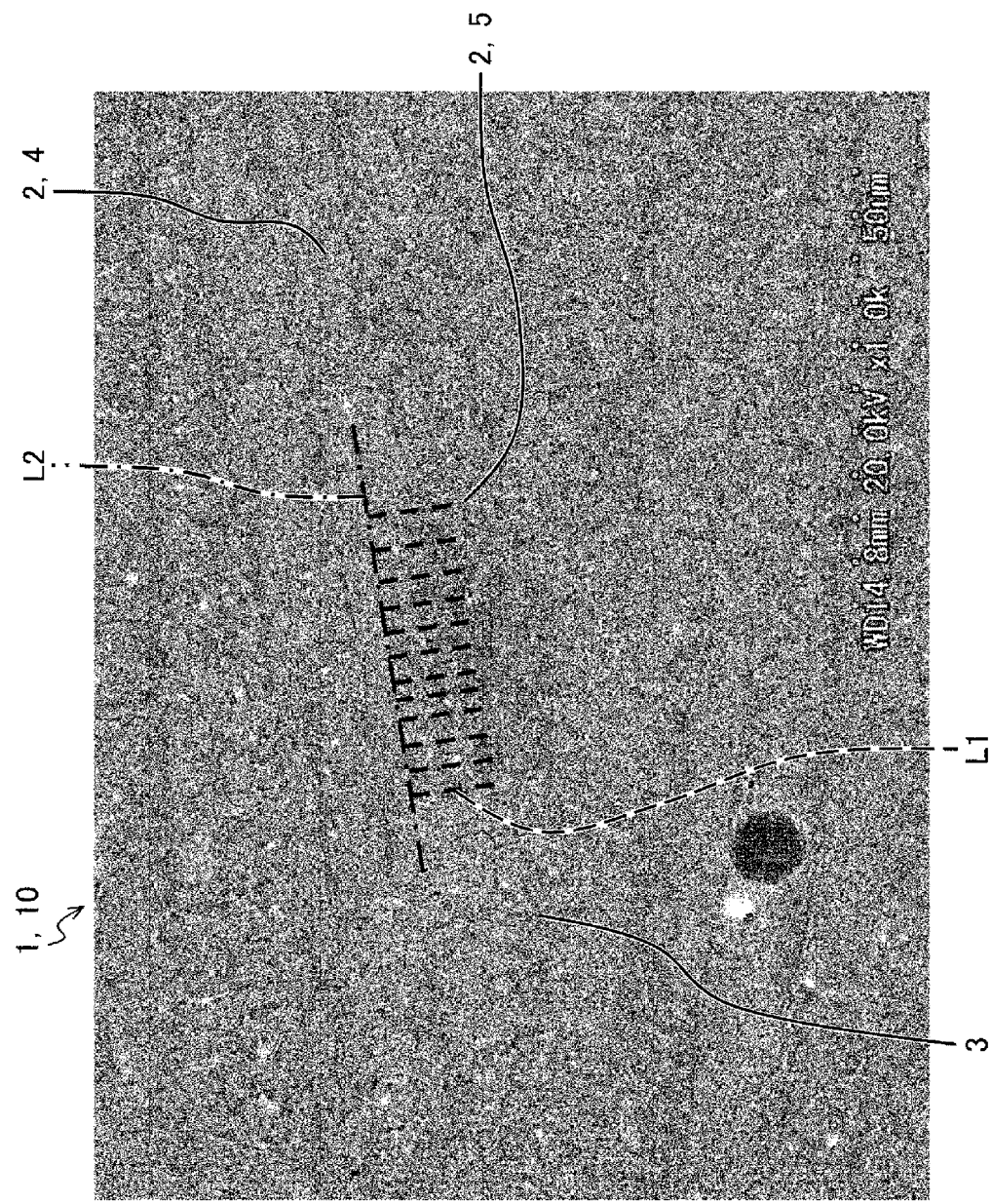
[FIG. 2]

[FIG. 3]
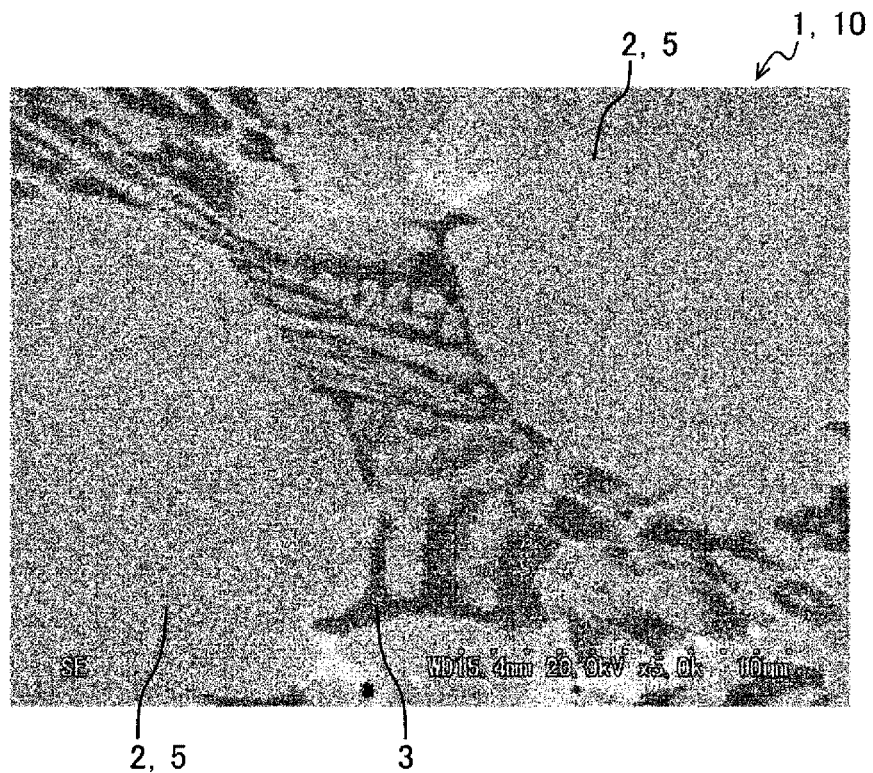
[FIG. 4]
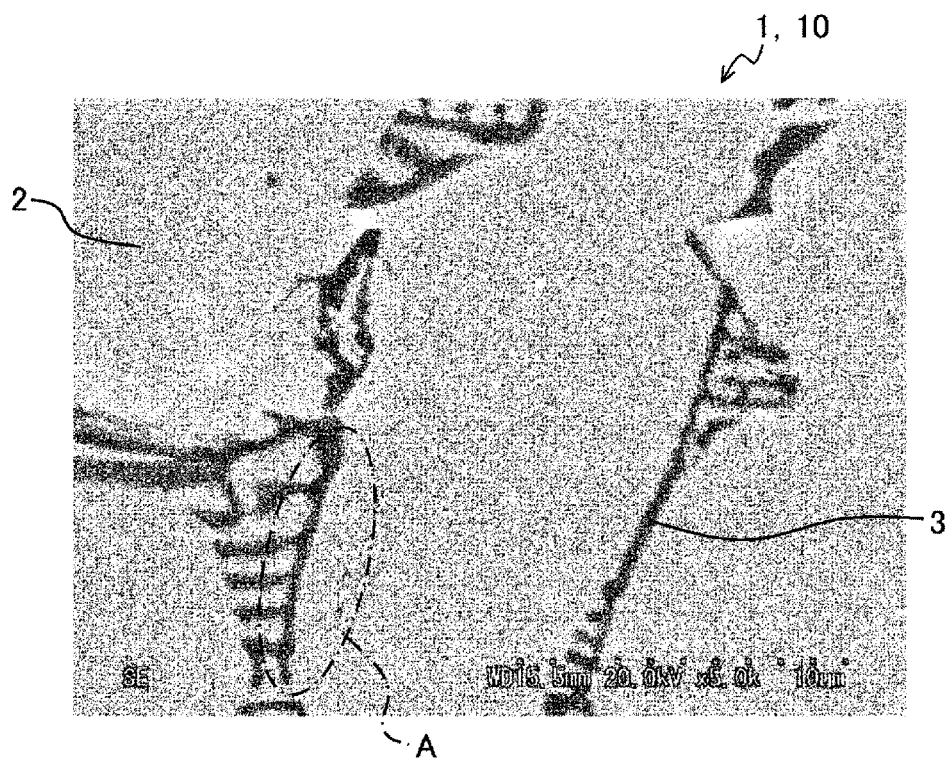

[FIG. 5A]
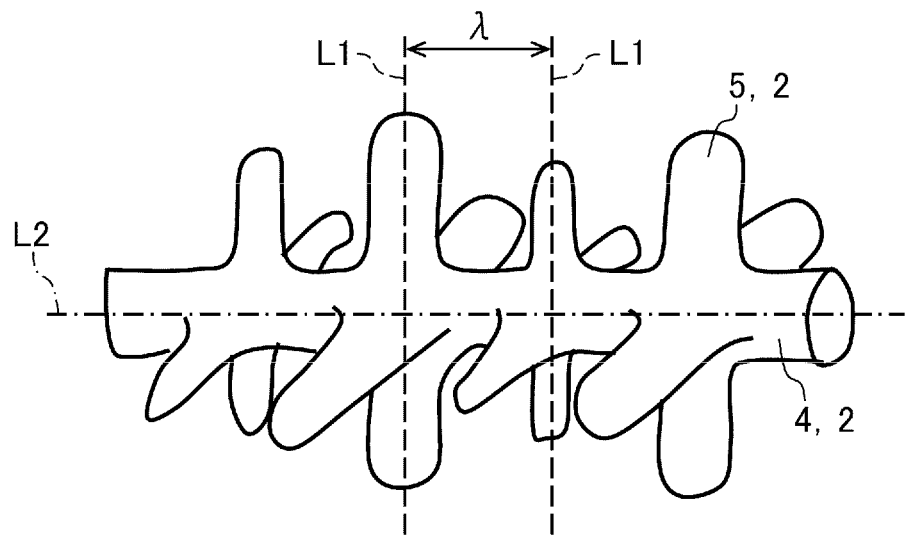
[FIG. 5B]
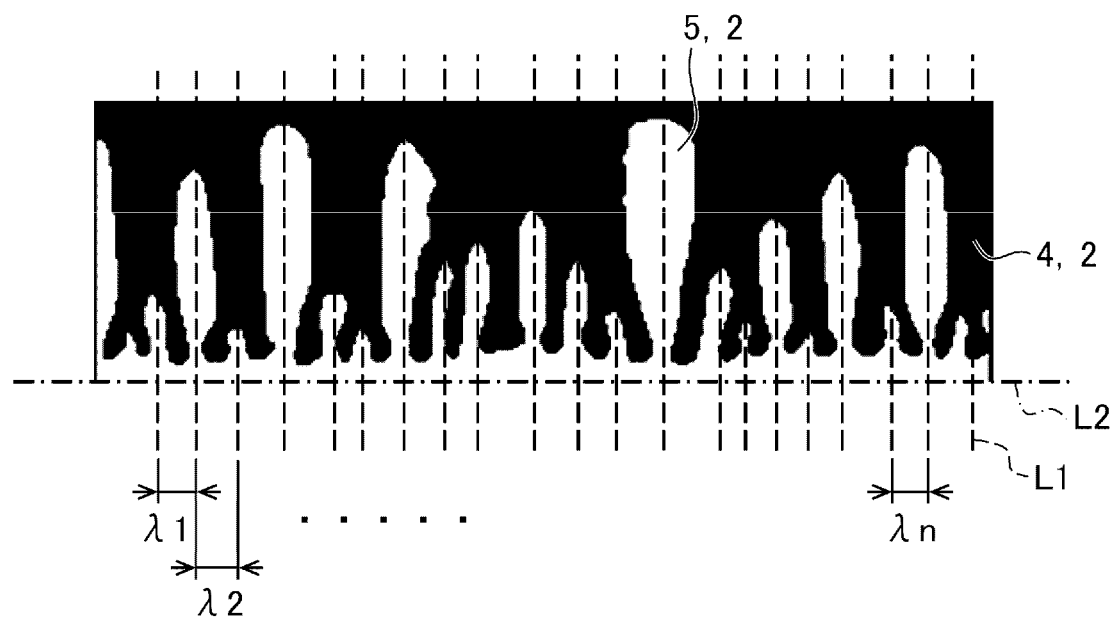

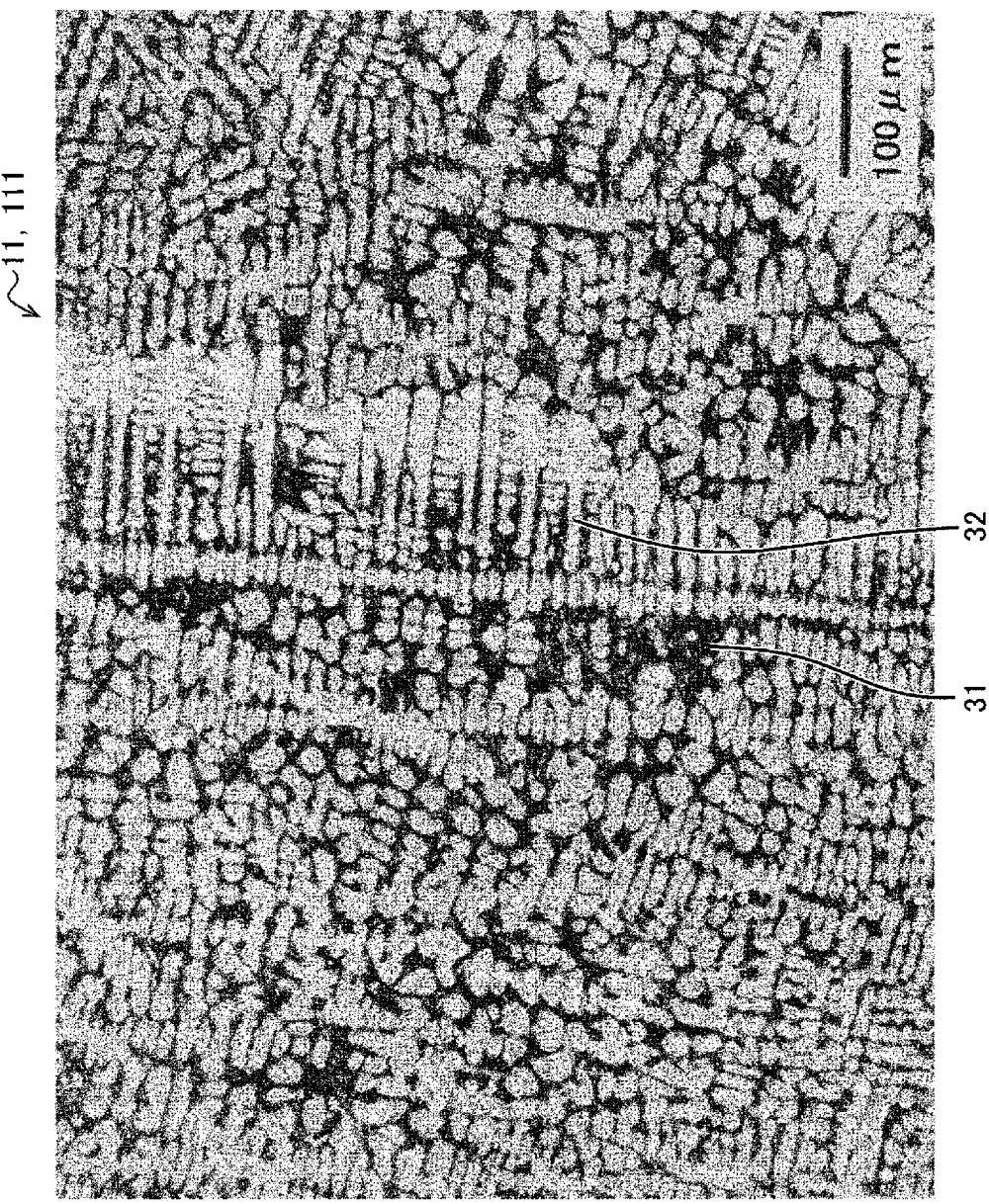
[FIG. 6]

[FIG. 7]
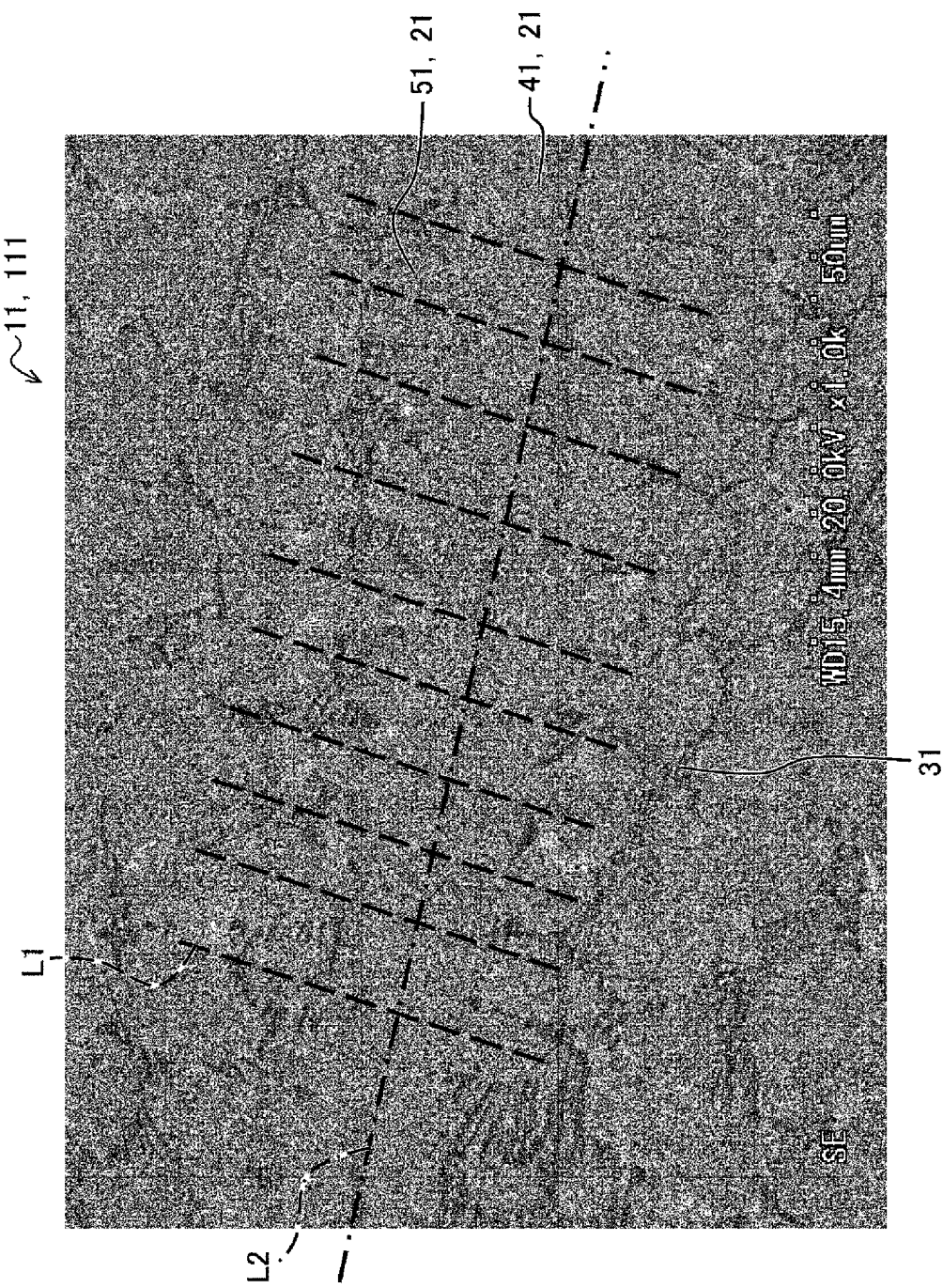

[FIG. 8A]
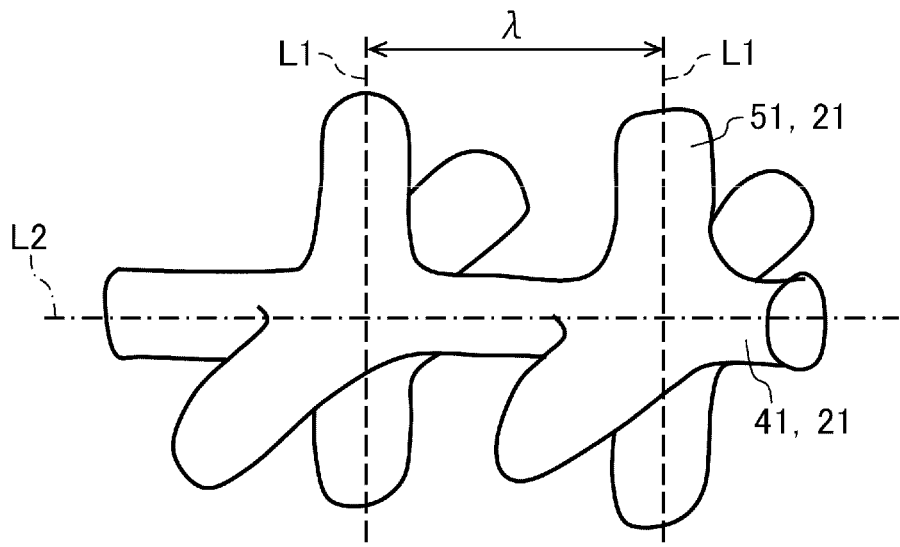
[FIG. 8B]
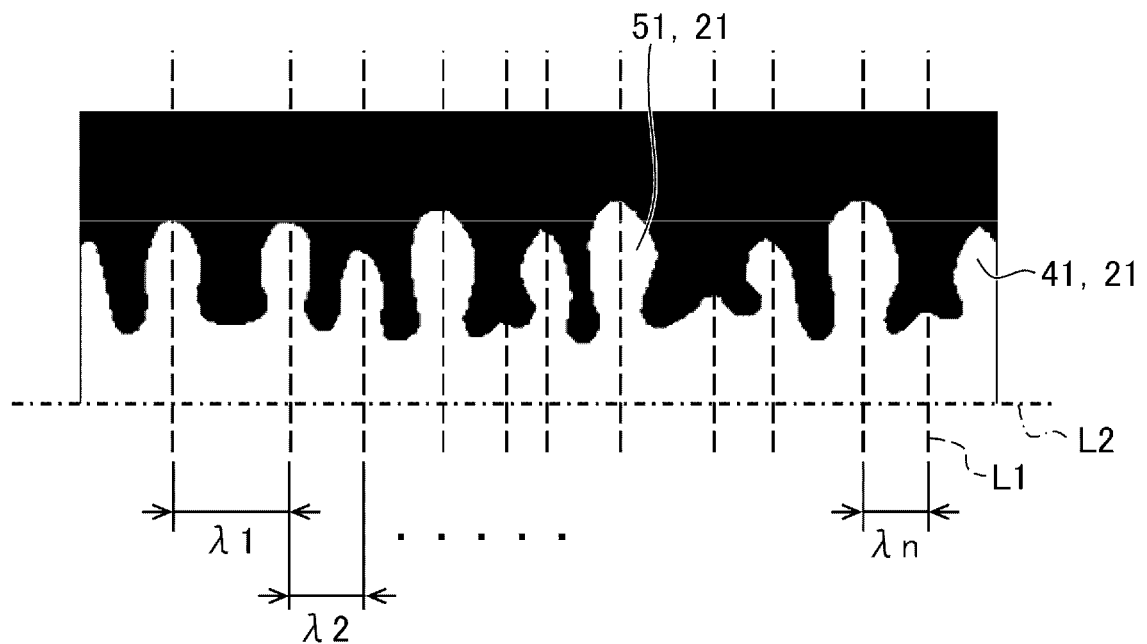

[FIG. 9]
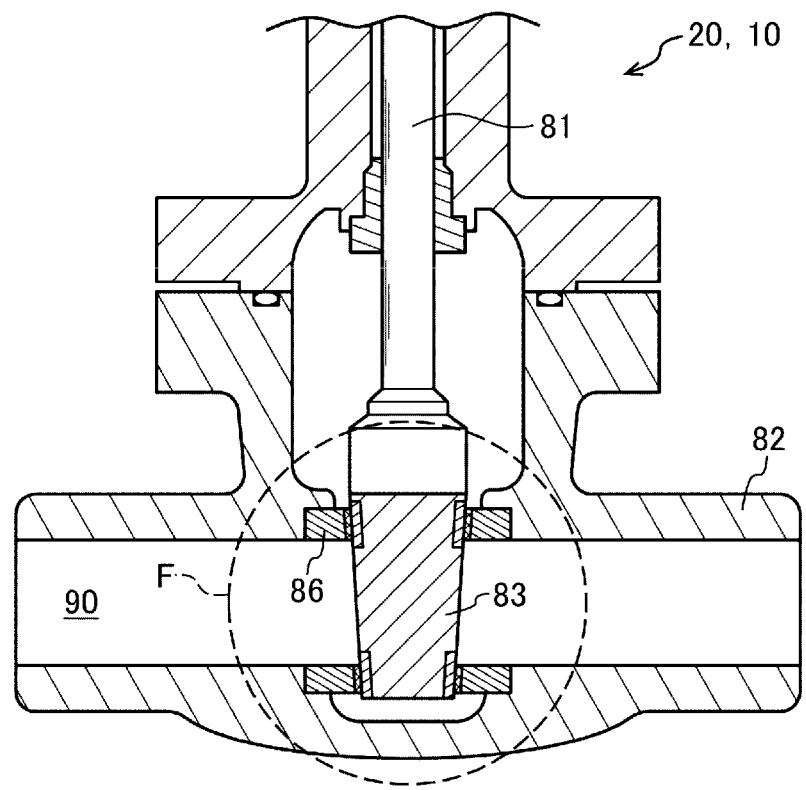
[FIG. 10]
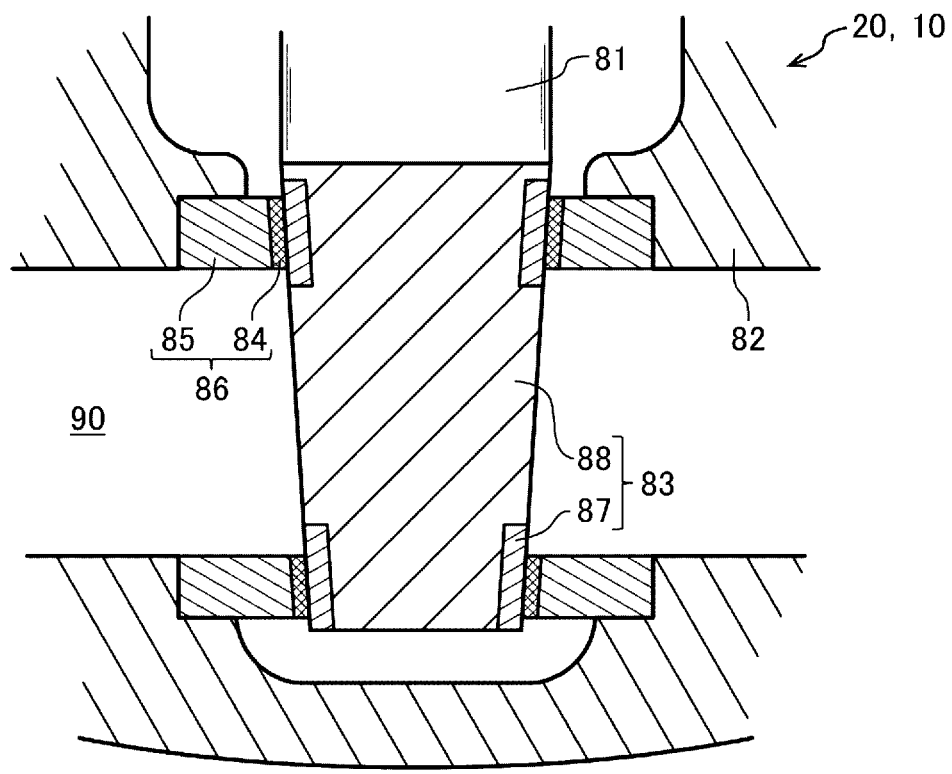

[FIG. 11]
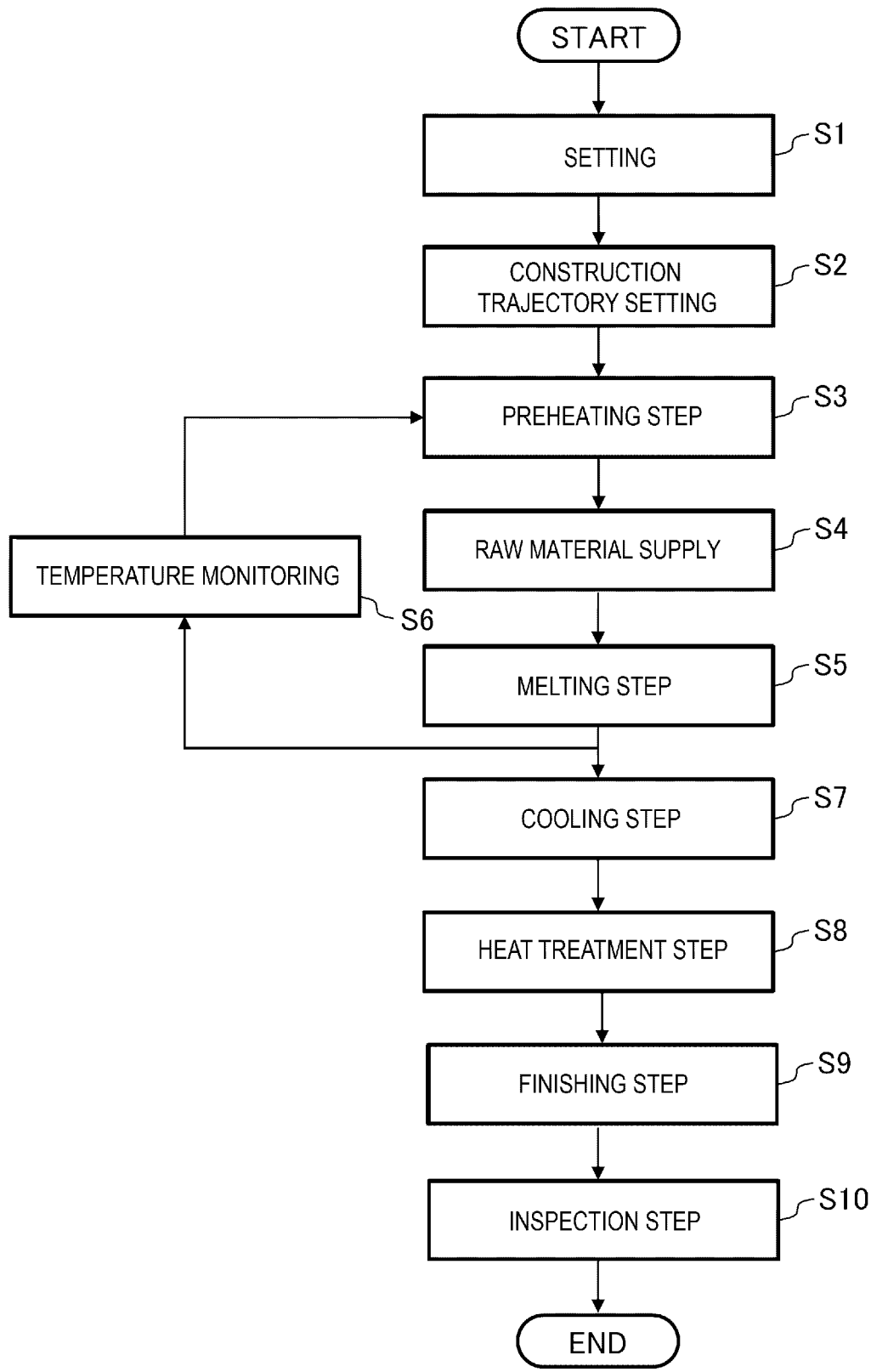

[FIG. 12]
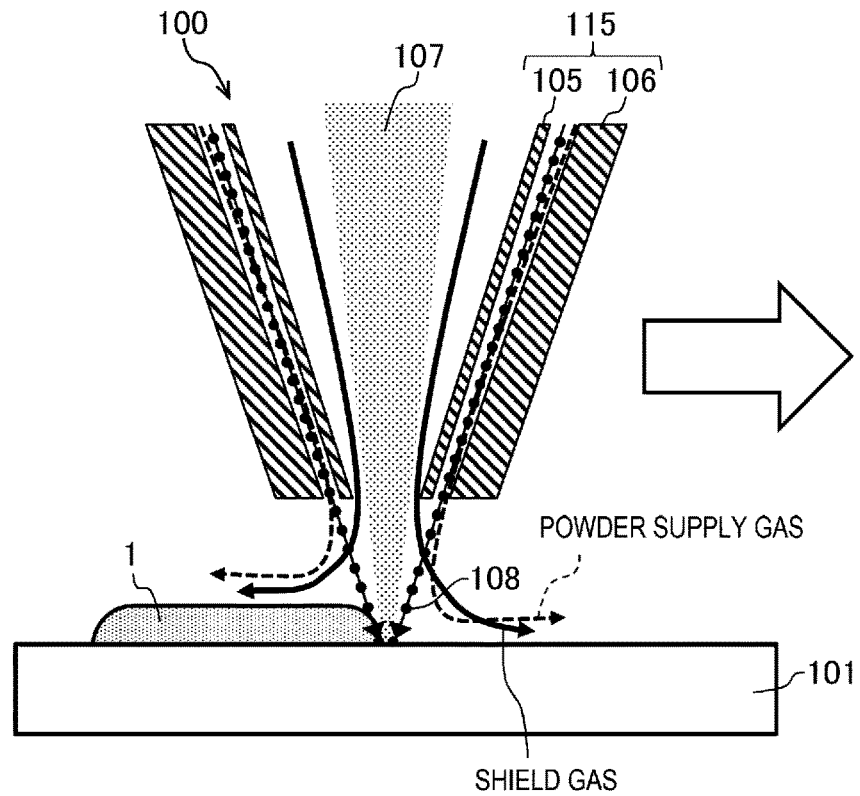
[FIG. 13]
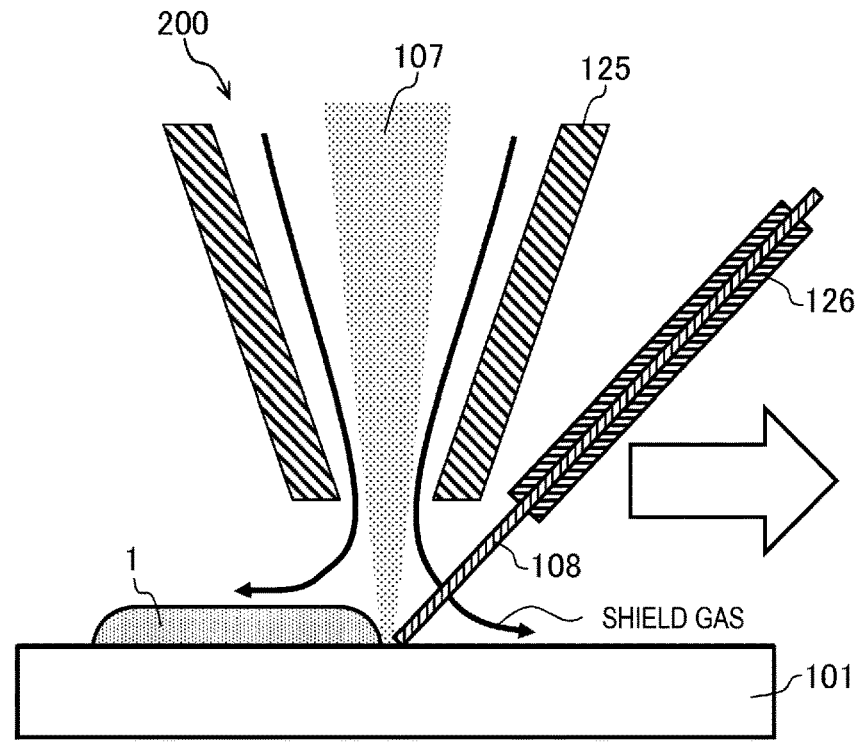

[FIG. 14]
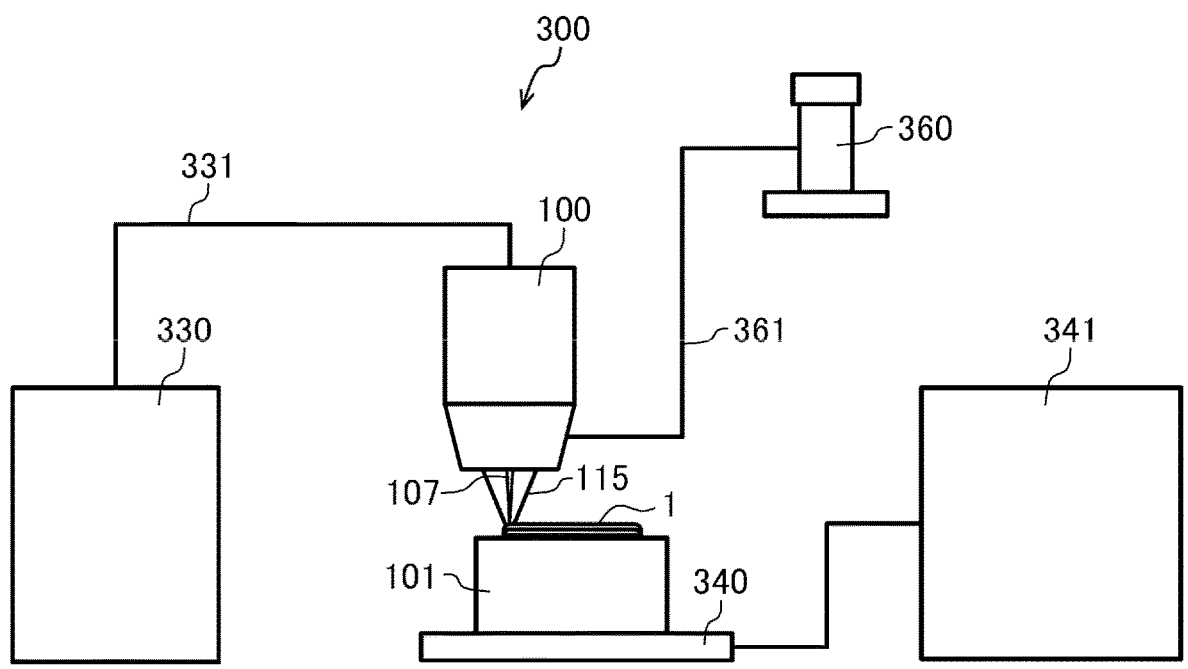

[FIG. 15A]
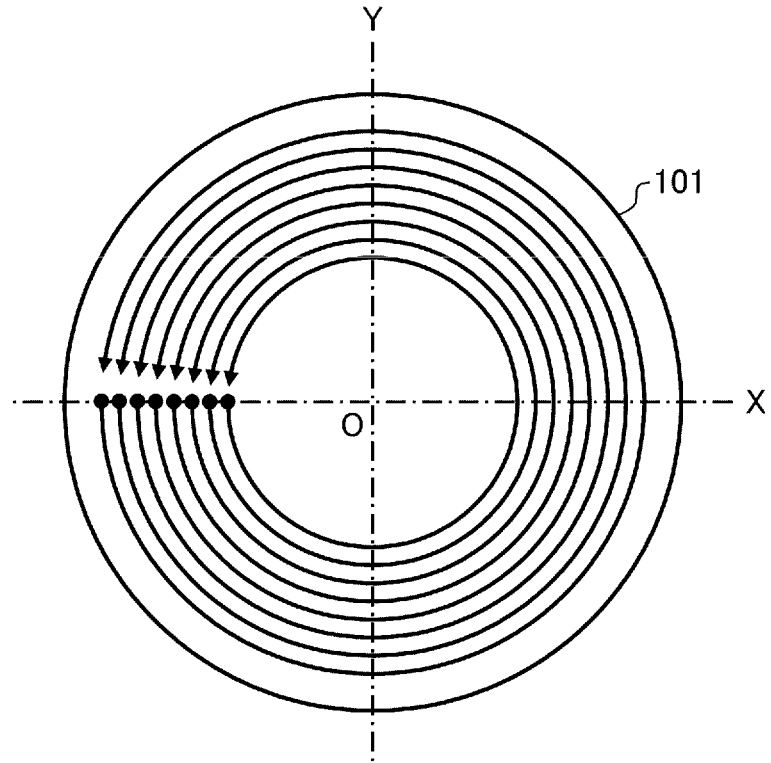
[FIG. 15B]
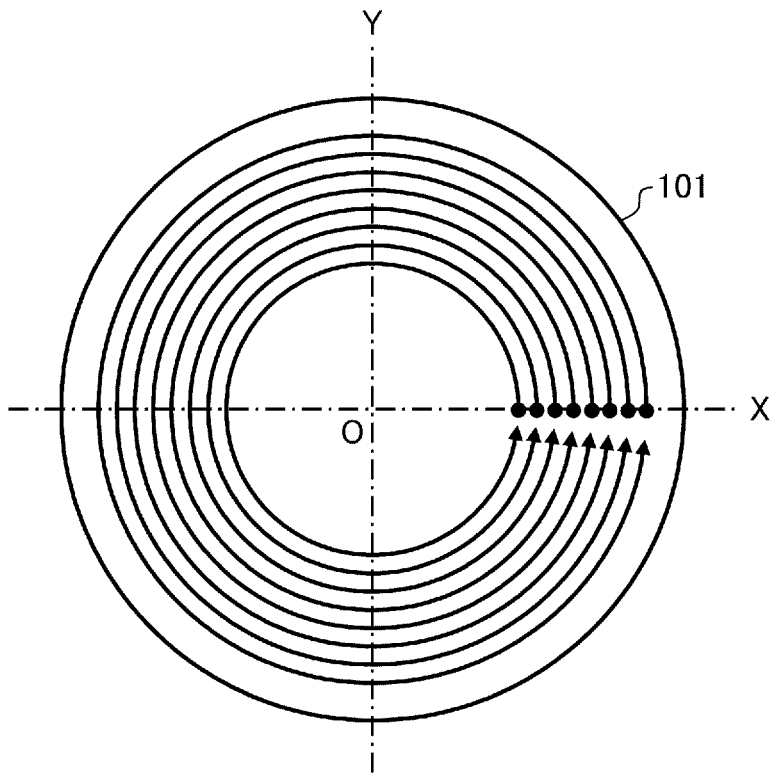

[FIG. 16]
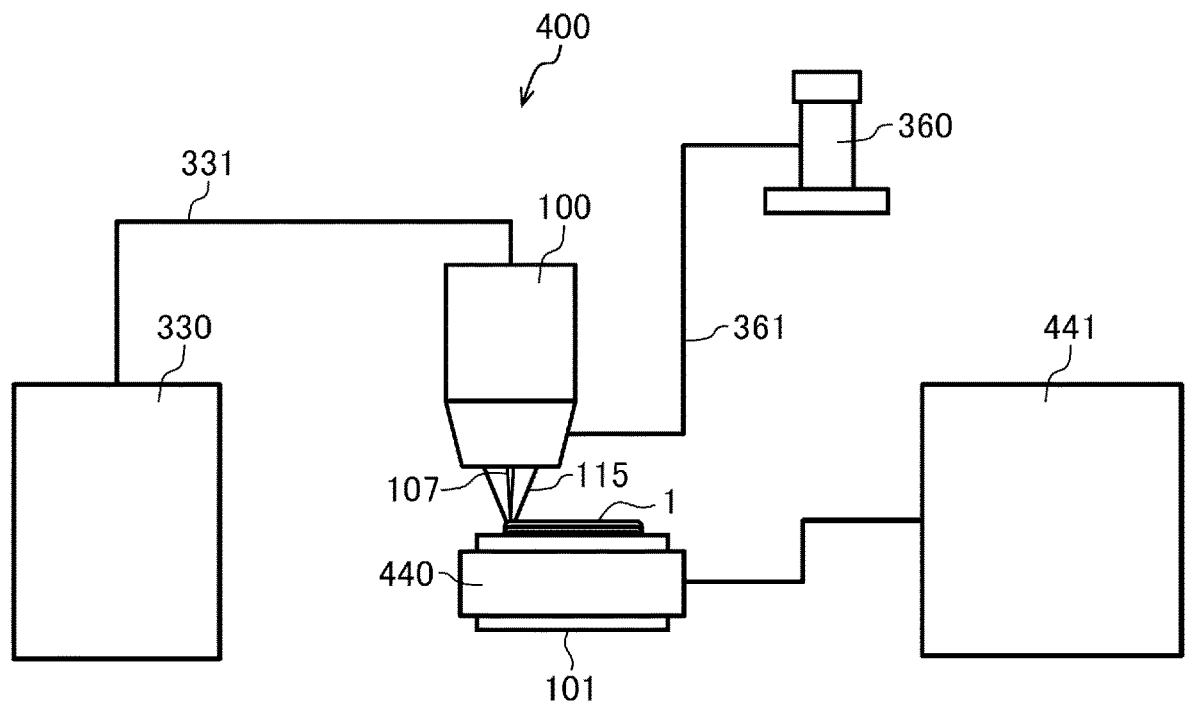

[FIG. 17A]
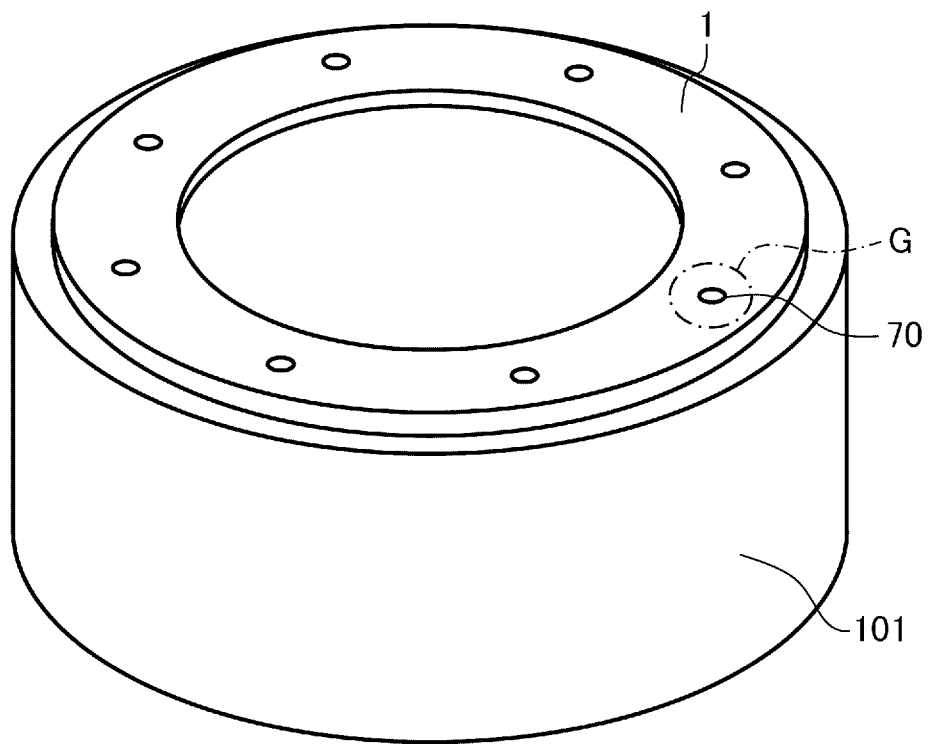
[FIG. 17B]
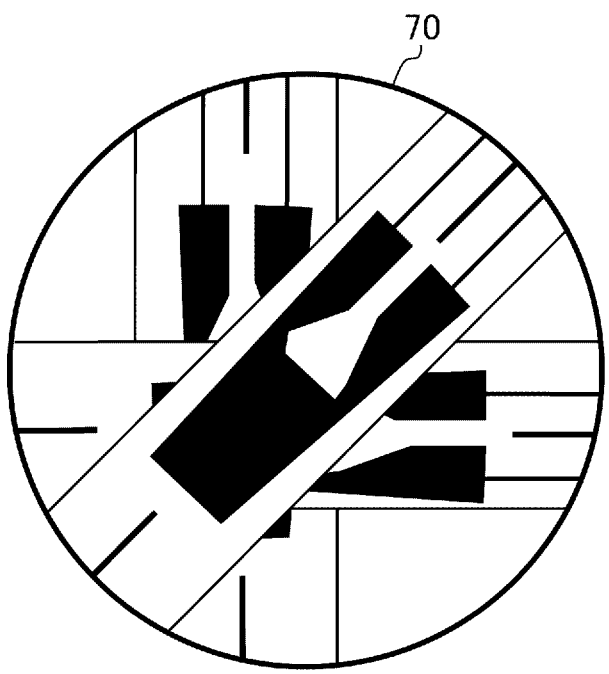

FLUID CONTACT MEMBER AND METHOD OF MANUFACTURING FLUID CONTACT MEMBER

TECHNICAL FIELD

The present invention relates to a fluid contact member and a method of manufacturing the fluid contact member.

BACKGROUND ART

A valve used in a power generation facility or the like includes a sliding part such as a valve seat. The valve seat preferably has high durability against an impact generated during an actual operation. For example, the valve seat preferably has high durability against impacts of high flow velocity, cavitation, droplets, and the like. In addition, from the viewpoint of stable equipment operation, the valve seat also preferably has high corrosion resistance in a high temperature environment.

The valve is manufactured by, for example, overlaying a hard deposited metal on a substrate such as carbon steel or stainless steel. Specifically, for example, the valve is manufactured by melting a deposited metal such as a cobalt-based alloy, a nickel-based alloy, and an iron-based alloy, which has excellent corrosion resistance and wear resistance, at a high temperature, and overlaying the molten deposited metal on the substrate of a valve body, a valve disc, and the like by arc welding, plasma welding, and the like.

However, when the deposited metal is overlaid by high temperature melting, a microstructure of the valve seat on which the deposited metal is overlaid has the same structure form as a microstructure of a metal material manufactured by casting. Therefore, a dendrite (a base part) is crystallized out during cooling from a molten state to a solid state. In addition, a compound phase such as eutectic carbide or eutectic boride is formed in an arm space of the dendrite (a dendrite arm space). Further, the durability and the wear resistance of the compound phase crystallized out in the dendrite arm space are inferior to the durability and the wear resistance of the dendrite. Therefore, due to characteristics of the compound phase crystallized out in the dendrite arm space, selective corrosion in the compound phase due to fluid contact with the deposited metal and corrosion progress on a surface of the deposited metal caused by erosion or the like are likely to proceed. For this reason, frequent inspection and repair work is performed, and the labor of maintenance work is large.

Therefore, a technique described in PTL 1 is known as a technique for suppressing the selective corrosion in the compound phase and the corrosion progress on the surface of the deposited metal. PTL 1 describes a corrosion-resistant and wear-resistant alloy in which eutectic carbide in an alloy including a base part of a casting structure and eutectic carbide is aggregated and formed into a plurality of grains or a plurality of spheres, and the eutectic carbide has a discontinuous distribution (see claim 1). PTL 1 also describes that this corrosion-resistant and wear-resistant alloy reduces deterioration of the overall corrosion-resistant and wear-resistant performance caused by corrosion damage of the eutectic carbide part (see paragraph 0044).

CITATION LIST

Patent Literature

PTL 1: JP-A-2000-273573

SUMMARY OF INVENTION

Technical Problem

An object of the invention is to provide a fluid contact member and a method of manufacturing the fluid contact member in which corrosion resistance is particularly improved than that in the related art.

Solution to Problem

The invention relates to a fluid contact member including a fluid contact portion configured to be in contact with a fluid, the fluid contact portion has a cobalt-based alloy phase having a dendrite, and a compound phase formed in an arm space of the dendrite and containing chromium carbide, and an average interval of secondary arms in the dendrite is 5 μm or less. Other solutions will be described later in embodiment of the invention.

Advantageous Effect

According to the invention, it is possible to provide a fluid contact member and a method of manufacturing the fluid contact member in which corrosion resistance is particularly improved than that in the related art.

BRIEF DESCRIPTION OF DRAWINGS

FIG. 1 is an optical image showing a cross-section of a microstructure constituting a fluid contact portion of an embodiment.

FIG. 2 is an enlarged view of FIG. 1.

FIG. 3 is an enlarged view of FIG. 1, and is an image having a magnification higher than that of FIG. 2.

FIG. 4 is an enlarged view of FIG. 1, is an image having a magnification higher than that of FIG. 2, and is an image obtained by enlarging a part in FIG. 1 different from that of FIG. 3.

FIG. 5A is a perspective view showing secondary arms in a dendrite in a microstructure of the fluid contact portion of the embodiment.

FIG. 5B is a cross-sectional view showing the secondary arms in the dendrite in the microstructure of the fluid contact portion of the embodiment.

FIG. 6 is an optical image showing a cross-section of a microstructure of a fluid contact portion (comparative example) formed by oxygen-acetylene gas welding.

FIG. 7 is an optical image showing a cross-section of a microstructure of a fluid contact portion (comparative example) formed by TIG welding.

FIG. 8A is a perspective view showing secondary arms in a dendrite in a microstructure of a fluid contact portion of the comparative example.

FIG. 8B is a cross-sectional view showing the secondary arms in the dendrite in the microstructure of the fluid contact portion of the comparative example.

FIG. 9 is a cross-sectional view of a valve including a valve disc and a valve seat as the fluid contact member of the embodiment.

FIG. 10 is an enlarged view of a part F in FIG. 9.

FIG. 11 is a flowchart showing a method of manufacturing the fluid contact member according to the embodiment.

FIG. 12 is a diagram showing a device of manufacturing the fluid contact member.

FIG. 13 is a diagram showing another device of manufacturing the fluid contact member.

FIG. 14 is a diagram showing a manufacturing device used in Example 1.

FIG. 15A is a diagram showing a molding pass in Example 1.

FIG. 15B is a diagram showing the molding pass in Example 1.

FIG. 16 is a diagram showing another manufacturing device used in Example 2.

FIG. 17A is a perspective view of a substrate on which a fluid contact portion in Example 2 is formed.

FIG. 17B is an enlarged view of a part G in FIG. 17A.

DESCRIPTION OF EMBODIMENTS

Hereinafter, the embodiments of the invention will be described with reference to the drawings. However, the invention is not limited to the following examples at all, and can be implemented with any modification within a range not departing from the gist of the invention. In addition, the invention can be implemented in any combination of each embodiment. In addition, the same devices and systems are designated by the same reference numerals, and redundant description will be omitted.

A fluid contact member 10 according to the invention includes a fluid contact portion 1 that is to be in contact with a fluid. Specifically, the fluid contact member 10 corresponds to, for example, a valve disc 83 and a valve seat 86 (see FIG. 9 or the like) in a valve 20 (see FIG. 9 or the like). That is, the fluid contact portion 10 includes at least one of the valve disc 83 and the valve seat 86. In addition, the fluid contact portion 1 corresponds to, for example, contact portions 84 and 87 of the valve disc 83 and the valve seat 86 (see FIG. 9 or the like). The fluid contact portion 1 is formed, for example, on a surface of a substrate (for example, a valve seat main body portion 85 and a valve disc main body portion 88 shown in FIG. 9 and the like) constituting the fluid contact member 10.

FIG. 1 is an optical image showing a cross-section of a microstructure constituting the fluid contact portion 1 of the embodiment. The fluid contact portion 1 has a cobalt-based alloy phase 2 having a dendrite and a compound phase 3 formed in a dendrite arm space and containing chromium carbide. A white part in FIG. 1 is the cobalt-based alloy phase 2. In addition, a black part in FIG. 1 is the compound phase 3. The dendrite refers to a branched dendritic crystal.

The microstructure of the fluid contact portion 1 is configured in a mesh shape having fine meshes. Specifically, in the fluid contact portion 1, the fine compound phase 3 is dispersed in gaps of the cobalt-based alloy phase 2 extending in a stripe shape in vertical, horizontal, and oblique directions. Therefore, the compound phase 3 is discontinuously formed in the dendrite arm spaces of the cobalt-based alloy phase 2. Since the compound phase 3 is discontinuously formed in the dendrite arm spaces, even when erosion occurs in the compound phase 3 positioned in the contact portion with the fluid, the erosion hardly proceeds. Accordingly, an increase in voids in the microstructure due to the proceeding of the erosion can be suppressed, and the cobalt-based alloy phase 2 can be suppressed from falling off.

FIG. 2 is an enlarged view of FIG. 1. The cobalt-based alloy phase 2 includes a trunk (not shown), primary arms 4 laterally extending from the trunk, and secondary arms 5 laterally extending from the primary arm 4. All of the trunk, the primary arm 4, and the secondary arms 5 constitute the dendrite. A plurality of secondary arms 5 extend from one primary arm 4 constituting the dendrite. A center line L1 (broken line) of the secondary arm 5 represents a perpendicular line from a tip of the secondary arm 5 to a center line L2 of the primary arm 4. Then, an interval between the center lines L2 of the secondary arms 5 indicated by the broken line in FIG. 2, that is, an average interval between adjacent secondary arms 5 is 5 μm or less, and specifically, is 2.7 μm in an example of FIG. 2.

FIG. 3 is an enlarged view of FIG. 1, and is an image having a magnification higher than that of FIG. 2. FIG. 3 particularly shows the compound phase 3 formed in arm spaces between adjacent secondary arms 5, among the compound phase 3 formed in the arm spaces of the cobalt-based alloy phase 2. As described above, the compound phase 3 is discontinuously formed in the dendrite arm spaces of the cobalt-based alloy phase 2. Specifically, as shown in FIG. 3, between the adjacent secondary arms 5, a compound phase 3 having a shape in which the cobalt-based alloy phase 2 bites into the compound phase 3 is formed without presence of a flat-shaped compound phase 3 having a certain size. In addition, the compound phase 3 is divided into fine sizes by the cobalt-based alloy phase 2.

In particular, when the average interval between the adjacent secondary arms 5 is 5 μm or less, the compound phase 3 is fine. Accordingly, the fine compound phase 3 can be discontinuously arranged, and even if the erosion proceeds, it is possible to suppress an excessive increase in the voids in the microstructure due to the proceeding of the erosion. As a result, even if the erosion proceeds, the strength of the microstructure is less likely to be affected, and the cobalt-based alloy phase 2 can be suppressed from falling off.

FIG. 4 is an enlarged view of FIG. 1, is an image having a magnification higher than that of FIG. 2, and is an image obtained by enlarging a part in FIG. 1 different from that of FIG. 3. FIG. 4 particularly shows a compound phase 3 formed in an arm space between facing secondary arms 5, among the compound phase 3 formed in the arm spaces of the cobalt-based alloy phase 2. In FIG. 4, the fine compound phase 3 is also discontinuously formed in the arm spaces of the secondary arms 5. However, the "discontinuously" as used herein refers to a concept including that a part of the compound phase 3 is connected, but the compound phase 3 is substantially discontinuous as shown in a part A of FIG. 4.

FIG. 5A is a perspective view showing secondary arms 5 in a dendrite in a microstructure of the fluid contact portion of the embodiment. A plurality of secondary arms 5 laterally extending from one primary arm 4 extend not only in a vertical direction of a paper surface but also in a front-back direction of the paper surface in FIG. 5A. Therefore, in the present description, an interval λ of the secondary arms 5 represent an interval λ between the adjacent secondary arms 5 in a cross-sectional view including the center line L1 of one secondary arm 5 and the center line L2 of a primary arm serving as a starting point of the one secondary arm 5.

FIG. 5B is a cross-sectional view showing the secondary arms in the dendrite in the microstructure of the fluid contact portion of the embodiment. The cross-sectional view shown in FIG. 5B includes the center line L1 of the one secondary arm 5 and the center line L2 of the primary arm 4 serving as a starting point of the one secondary arm 5. In this cross-sectional view, the intervals between the adjacent secondary arms 5 are $\lambda 1, \lambda 2 \ldots \lambda n$. Here, definition of the average interval of the secondary arms 5 in the dendrite in the present description will be described.

In the intervals $\lambda 1, \lambda 2 \ldots \lambda n$ between the adjacent secondary arms 5, n is, for example, an integer of 10 or more and 15 or less. Therefore, first, 10 to 15 adjacent secondary arms 5 are selected in any cross section. Then, the intervals λ between the selected secondary arms 5 are measured, and an average value is obtained by arithmetic average. By repeating these operations a total of three times in different cross sections and calculating an average value of the intervals in the three cross-sectional views, the average interval of the secondary arms 5 is calculated.

The average interval of the secondary arms 5 calculated in this manner is 5 μm or less. By setting the average interval of the secondary arms 5 to 5 μm or less, the compound phase 3 formed between adjacent secondary arms 5 can be made fine. Accordingly, the fluid is less likely to come into contact with the compound phase 3, and the corrosion of the compound phase 3 can be suppressed. In addition, even if the corrosion of the compound phase 3 proceeds, the cobalt-based alloy phase 2 can be suppressed from falling off due to damage that affects the corrosion resistance of the fluid contact portion 1, specifically, for example, erosion damage. As a result, the corrosion resistance of the fluid contact portion 1 can be particularly improved.

The average interval of the secondary arms 5 is preferably 3 μm or less. By setting the average interval of the secondary arms 5 to 3 μm or less, the compound phase 3 formed between adjacent secondary arms 5 can be made finer. Accordingly, the fluid is further less likely to come into contact with the compound phase 3, and the corrosion of the compound phase 3 can be suppressed more sufficiently. In addition, even if the corrosion of the compound phase 3 proceeds, the cobalt-based alloy phase 2 can be suppressed more sufficiently from falling off due to damage that affects the corrosion resistance of the fluid contact portion 1, specifically, for example, erosion damage. As a result, the corrosion resistance of the fluid contact portion 1 can be particularly improved sufficiently.

The average interval of the secondary arms 5 is not particularly limited, and is usually, for example, 1 μm or more.

The composition constituting the microstructure shown in FIGS. 1 to 5 is not particularly limited as long as the composition contains cobalt, chromium, and carbon. If the composition contains cobalt, chromium, and carbon, the fluid contact portion 1 including the cobalt-based alloy phase 2 and the compound phase 3 containing chromium carbide is obtained due to easy bonding of atoms.

In the microstructure constituting the fluid contact portion 1, a content of carbon is preferably 0.9% by mass or more and 5% by mass or less (preferably 3% by mass or less). A content of chromium is preferably 26% by mass or more and 32% by mass or less. A content of tungsten is preferably 0% by mass or more and 6% by mass or less. A content of nickel is preferably 0% by mass or more and 1% by mass or less. A content of iron is preferably 0% by mass or more and 1% by mass or less. A content of molybdenum is preferably 0% by mass or more and 1% by mass or less. Therefore, the fluid contact portion 1 preferably contains 0.9% by mass or more of carbon, 26% by mass or more and 32% by mass or less of chromium, 0% by mass or more and 6% by mass or less of tungsten, 0% by mass or more and 1% by mass or less of nickel, 0% by mass or more and 1% by mass or less of iron, 0% by mass or more and 1% by mass or less of molybdenum, and cobalt and inevitable impurities as balance.

However, the content of tungsten is preferably 3% by mass or more and 6% by mass or less. By setting the content of tungsten within this range, the hardness of the fluid contact portion 1 can be increased, and for example, the wear resistance can be further improved.

Examples of metal contained in the microstructure constituting the fluid contact portion 1 include Stellite (registered trademark) or the like.

FIG. 6 is an optical image showing a cross-section of a microstructure of a fluid contact portion (comparative example) formed by oxygen-acetylene gas welding. A metal constituting a fluid contact portion 11 shown in FIG. 6 and the metal constituting the fluid contact portion 10 shown in FIG. 1 have the same composition. Similar to the fluid contact portion 1, the fluid contact portion 11 includes a cobalt-based alloy phase 21 having a dendrite and a compound phase 31 formed in dendrite arm spaces and containing chromium carbide. A white part in FIG. 6 is the cobalt-based alloy phase 21. In addition, a black part in FIG. 1 is the compound phase 31. In the microstructure formed by the oxygen-acetylene gas welding, although not shown, secondary arms having intervals of 5 μm or less was also partially confirmed. However, an average interval of the secondary arms calculated by the above method greatly exceeded 5 μm, and specifically, was 17 μm or more.

FIG. 7 is an optical image showing a cross-section of a microstructure of a fluid contact portion 111 (the comparative examples) formed by TIG welding. The cobalt-based alloy phase 21 includes a trunk (not shown), primary arms 41 extending laterally from the trunk, and secondary arms 51 extending laterally from the primary arm 41. Center lines L1 and L2 indicated by a broken line and an alternate long and short dash line respectively represent center lines of the secondary arm 51 and the primary arm 41. The optical image shown in FIG. 7 and the optical image shown in FIG. 2 have the same magnification. An interval of the secondary arms 51 in the comparative example shown in FIG. 7 is wider than the interval of the secondary arms 5 in the embodiment shown in FIG. 2. Specifically, in the fluid contact portion 111 shown in FIG. 7, the secondary arms 51 having intervals of 5 μm or less (intervals between the center lines L1) were also partially confirmed. However, similar to the microstructure shown in FIG. 6, in the fluid contact portion 111 shown in FIG. 7, an average interval of the secondary arms 51 exceeds 5 μm. Specifically, in the example shown in FIG. 7, the average interval of the secondary arms 5 was 9.95 μm or more.

FIG. 8A is a perspective view showing the secondary arms 51 in the dendrite in the microstructure of the fluid contact portion 111 of the comparative example. Similar to the fluid contact portion 1 (see FIG. 5A), the secondary arms 51 laterally extending from the secondary arm 41 extend not only in a vertical direction of a paper surface but also in a front-back direction of the paper surface in FIG. 8A.

FIG. 8B is a cross-sectional view showing the secondary arms 51 in the dendrite in the microstructure of the fluid contact portion 111 of the comparative example. Similar to the cross-sectional view shown in FIG. 5B, the cross-sectional view shown in FIG. 8B includes a center line L1 of one secondary arm 51 and a center line L2 of the primary arm 41 serving as a starting point of the one secondary arm 5.

When the intervals between the center lines L1 are set to λ1, λ2 . . . λn, the intervals between the center lines L1 indicated by λ1 to λn, that is, the intervals of the secondary arms 51 are all longer than the intervals in the fluid contact portion 10 shown in FIG. 2 or the like. Specifically, in the comparative example shown in FIG. 8B, the average interval of the secondary arms 51 exceeds 5 μm. Therefore, the compound phase 31 (see FIG. 7) formed between the secondary arms 51 also increases, and when the erosion of the compound phase 3 occurs, the mechanical influence to the fluid contact portion 11 increases due to the proceeding of the erosion. Accordingly, the cobalt-based alloy phase 21 easily falls off due to the erosion damage or the like, and the corrosion resistance decreases.

FIG. 9 is a cross-sectional view of the valve 20 including the valve disc 83 and the valve seat 86 as the fluid contact member 10 of the embodiment. The fluid contact member 10 is, for example, a fluid contact member 10 for a nuclear facility. For example, the valve 20, and the valve disc 83 and the valve seat 86 provided therein can be used, for example, as a gate valve and constituent members thereof provided in a pipe, a duct, and the like in the nuclear facility. A fluid such as a gas (air or the like), a liquid (water or the like), and a gas-liquid mixed fluid flows through the pipe. Since the fluid flows through the valve 20, the valve 20 is preferably excellent in the corrosion resistance particularly. Therefore, the fluid contact member 10 including the fluid contact portion 1 (see FIG. 1 and the like) which is particularly excellent in the corrosion resistance is suitable as, for example, the valve disc 83 and the valve seat 86.

The valve 20 includes a valve rod 81, a valve body 82, the valve disc 83, and the valve seat 86. The valve rod 81 and the valve disc 83 are accommodated in the valve body 82. The valve rod 81 is connected to the valve disc 83. The valve disc 83 has a truncated cone shape narrowing toward a side opposite a side connected to the valve rod 81. The valve seat 86 is formed in a circular flat plate (that is, an annular shape) so as to surround a flow path 90 having a circular cross section in which the fluid flows through. The valve seat 86 is fixed to the valve body 82 by, for example, welding, fitting, and the like.

FIG. 10 is an enlarged view of a part F in FIG. 9. The valve disc 83 (the fluid contact member 10) includes a contact portion 87 formed at a position being in contact (pressure contact) with the valve seat 86 when the valve disc 83 is located at a lowermost end and the valve disc main body portion 88 on a surface of which the contact portion 87 is formed. The contact portion 87 (the fluid contact portion 1) is formed on the valve disc main body portion 88 by, for example, overlaying (for example, lamination molding) using the valve disc main body portion 88 as a substrate.

In addition, the valve seat 86 (the fluid contact member 10) fixed to the valve body 82 includes a contact portion 84 formed at a position being in contact (pressure contact) with the contact portion 87 of the valve disc 83 when the valve disc 83 is located at the lowermost end, and the valve seat main body portion 85 on a surface of which the contact portion 84 is formed. The contact portion 84 (the fluid contact portion 1) is formed on the valve seat main body portion 85 by, for example, overlaying (lamination molding) using the valve seat main body portion 85 as a substrate.

The valve rod 81 and the valve disc 83 are movable in the vertical direction by a drive device (not shown) such as a cylinder. During downward movement of the valve rod 81 and the valve disc 83, the valve rod 81 and the valve disc 83 move downward while the contact portion 87 of the valve disc 83 slides on the contact portion 84 of the valve seat 86. Then, the valve disc 83 closes the flow path 90 by the movement of the valve disc 83 to the lowermost end, and the fluid flow in the flow path 90 is blocked.

The contact portion 87 of the valve disc 83 has the microstructure described with reference to FIG. 1 or the like. In addition, the contact portion 84 of the valve seat 86 also has the microstructure described with reference to FIG. 1 or the like. Therefore, continuous corrosion is less likely to occur in the contact portions 84 and 87, and particularly, the corrosion resistance is excellent. Therefore, even when the sliding between the contact portions 84 and 87 is repeated by opening and closing of the valve 20, the erosion damage is suppressed. Accordingly, the fluid is less likely to come into contact with the compound phase 3, and the corrosion of the compound phase 3 can be suppressed. In addition, even if the corrosion of the compound phase 3 proceeds, the cobalt-based alloy phase 2 can be suppressed from falling off due to damage that affects the corrosion resistance of the fluid contact portion 1, specifically, for example, erosion damage. As a result, the corrosion resistance of the fluid contact portion 1 can be particularly improved.

In particular, the valve 20 can be used for, for example, the pipe in the nuclear facility. Therefore, by suppressing the dendrite of the cobalt-based alloy from falling off, for example, cobalt contained in the cobalt-based alloy phase 2 constituting the valve 20 can be suppressed from being unintentionally changed to a radioisotope.

In addition, the fluid contact member 10 can be applied to other valves including a valve body and a valve disc and including valve seats on surfaces on which the valve body and the valve disc slide, in addition to the gate valve. Further, in addition to the valve 20, the fluid contact member 10 can be applied as long as the fluid contact portion 1 that comes into contact with the fluid is provided.

That is, as described above, it is needless to say that wear easily occurs due to sliding, and even if there is no particular sliding, wear may occur due to long-term contact with the fluid or the like such as in an inner wall of the pipe. In addition, for example, regarding the inner wall of the pipe, the inner wall of the pipe may be damaged by contact of a maintenance jig with the inner wall due to maintenance or the like. However, for example, by forming the fluid contact portion 1 on the inner wall of the pipe (the fluid contact member 10), the corrosion resistance of the inner wall of the pipe can be particularly improved. Accordingly, it is needless to say that the wear due to contact with the fluid can be suppressed, unintended damage due to the maintenance jig or the like can be suppressed, and the fluid contact member 10 excellent in maintenance performance can be manufactured.

FIG. 11 is a flowchart showing a method of manufacturing the fluid contact member according to the embodiment (hereinafter, referred to as a manufacturing method of the invention). The manufacturing method of the invention includes a setting step S1, a construction trajectory setting step S2, a preheating step S3, a raw material supply step S4, a melting step S5, a cooling step S7, a temperature monitoring step S6, a heat treatment step S8, a finishing step S9, and an inspection step S10. The manufacturing method of the invention will be described further with reference to FIG. 12.

FIG. 12 is a diagram showing a device 100 of manufacturing the fluid contact member 10. The manufacturing device 100 is a device for manufacturing the fluid contact member 10 (for example, the valve disc 83 and the valve seat 86) including the fluid contact portion 1 (for example, the contact portions 84 and 87) by melting a raw material 108. The melting of the raw material 108 in the manufacturing method of the invention is performed, by an additive manufacturing technique using a powder containing the raw material 108, on a substrate 101 such as carbon steel, stainless steel, and the like. By melting using the additive manufacturing technique, the fluid contact member 10 having a desired shape can be easily manufactured.

According to the term definition (ISO52900) by the International Standards Organization, the additive manufacturing technique referred to here is defined as a process of combining materials for manufacturing a member from 3D model data, and is classified into the following seven categories. That is, the additive manufacturing technique is classified into Binder jetting, Directed Energy Deposition, Materials Extrusion, Material jetting, Powder Bed Fusion, Sheet Lamination, and Vat Photo-Polymerization.

The additive manufacturing technique includes a directed energy deposition method and a powder bed fusion method, and any technique may be used. However, the directed energy deposition method is preferable from the viewpoint of easy molding on a three-dimensional component and good molding efficiency (high molding speed). Therefore, in the following description, as an example, lamination molding using a directed energy deposition device (for example, a laser light irradiation device) will be described.

First, the substrate 101 is set on a construction table (not shown) of the manufacturing device 100 (the setting step). The substrate 101 corresponds to, for example, the valve seat main body portion 85 and the valve disc main body portion 88. Next, a construction trajectory to the substrate 101 is set by positioning the laser light irradiation (the construction trajectory setting step S2). Then, the substrate 101 is preheated by a preheating device (not shown) (the preheating step S3). The substrate 10 can be preheated to a temperature similar to the melting temperature in the melting step S5 to be described later, for example, 200° C. or more and 700° C. or less. After the preheating, the supply of the raw material 108 onto the substrate 101 is started (the raw material supply step S4). As the raw material 108, a powder of a metal material (including cobalt, chromium, and carbon) constituting the fluid contact portion 1 is used.

On the substrate 101, the supplied raw material is melted (the melting step S5). That is, the melting step S5 is a step of melting the raw material containing cobalt, chromium, and carbon on the substrate while moving a supply position of the raw material to the substrate. By melting the raw material 108, the fluid contact portion 1 formed on the substrate 101 is obtained.

In the method shown in FIG. 12, a nozzle 115 having a double structure including an inner nozzle 105 and an outer nozzle 106 is used. The inner nozzle 105 and the outer nozzle 106 are formed so as to be narrowed toward the substrate 101. In addition, the inner nozzle 105 and the outer nozzle 106 are disposed concentrically around a laser light 107 emitted to the raw material 108 on the substrate 101. The laser light emission diameter is formed on the surface of the substrate 101. In addition, a laser head (not shown) for emitting the laser light 107 is integrally formed with the nozzle 115. Then, the nozzle 115 is disposed at a position having the predetermined laser emission diameter.

Inside the inner nozzle 105, a shield gas (for example, argon) flows toward the substrate 101 as indicated by a thick solid line arrow. The powdery raw material 108 flows between the inner nozzle 105 and the outer nozzle 106 as indicated by a thin line. In addition, a powder supply gas (for example, argon) flows toward the substrate 101 between the inner nozzle 105 and the outer nozzle 106 as indicated by a thick dashed arrow. Therefore, the raw material 108 is sprayed onto the substrate 101 by the flow of the powder supply gas.

However, in the example shown in FIG. 12, the powdery raw material 108 flows between the inner nozzle 105 and the outer nozzle 106 around the concentric circles, but the powdery raw material 108 may flow from a part around the concentric circles (may flow from only one place or from two or more places). In addition, the raw material 108 may be spread on the substrate 101.

The raw material 108 sprayed onto the substrate 101 is melted by the energy of the laser light 107. Then, while the raw material 108 is melted, the nozzle 115 is moved in a direction (for example, a direction of a white arrow in FIG. 10) along an upper surface of the substrate 101. That is, the melting step of melting the raw material 108 on the substrate 101 is performed while moving the supply position of the raw material 108 to the substrate 101. The supply position referred to here is a position along the substrate 101 of the nozzle 115. By moving the nozzle 115, the laser head integrally formed with the nozzle 115 is also moved. Therefore, the energy supply to a molten metal by the laser light 107 is stopped, and the molten metal is solidified. By solidifying the molten metal, the fluid contact member 10 including the fluid contact portion 1 is manufactured.

The fluid contact portion 1 is manufactured by, for example, molding (lamination molding) in a laminate structure based on emission of the laser light 107 twice or more. In the case of manufacturing by the lamination molding, in the melting step S5, the lamination molding is performed in a state where the inter-pass temperature is 200° C. or more and 700° C. or less. Therefore, after one-pass construction, in the temperature monitoring step S6, the temperature of the substrate 101 is monitored, and inter-pass temperature management is performed. By controlling the inter-pass temperature within this range, cracking of the fluid contact portion 1 due to carbon can be suppressed during the lamination molding.

The inter-pass temperature can be controlled by, for example, preheating of the substrate 101. Preheating of the substrate 101 can be performed by a heating device (not shown). Examples of the heating device include a direct heating device such as a heater and a burner, and a high-frequency induction heating device (for example, a high-frequency heating coil), and the heating device may be selected in consideration of the surrounding environment of the manufacturing device as appropriate.

However, during lamination molding, the temperature control of the substrate 101 may be performed together with the control of the inter-pass temperature, instead of the control of the inter-pass temperature. That is, in the melting step, the lamination molding may be performed in a state where at least one of the temperature of the substrate 101 and the inter-pass temperature is 200° C. or more and 700° C. or less. By controlling the temperature of the substrate 101 within this range, cracking of the fluid contact portion 1 due to carbon can be suppressed during the lamination molding.

Emission conditions (for example, laser output) of the laser light 107 and a scanning speed (a moving speed) of the nozzle 115 and the laser light 107 are not particularly limited. In the invention, the melting of the raw material 108 in the melting step S5 is performed such that when a heat input amount to the raw material per movement distance is set to Q (kJ/cm), and a supply amount (g/cm) of the raw material 108 to the substrate 101 per movement distance is set to W (kJ/g), Q≤12 kJ/cm and 2 kJ/g≤Q/W≤60 kJ/g.

The "per movement distance" referred to here refers to a movement distance of the nozzle 115 and the laser light 107 with respect to the substrate 101. Therefore, in the example shown in FIG. 12, the heat input amount Q is a value obtained by dividing the output of the laser light 107 (laser output; unit is kW) by the scanning speed (cm/sec) of the nozzle 115 and the laser light 107.

The heat input amount Q is 12 kJ/cm as described above, but is preferably 10 kJ/cm or less, more preferably 7 kJ/cm or less, and particularly preferably 5 kJ/cm or less. The smaller the heat input amount is, the shorter the time until the raw material is sufficiently cooled can be, and precipitation of the compound phase 3 in a temperature range in which the compound phase 3 such as carbide is precipitated can be suppressed. Meanwhile, a lower limit of the heat input amount Q is, for example, 1 kJ/cm or more, and preferably 3 kJ/cm or more. The raw material 108 can be sufficiently melted by setting the heat input amount Q equal to or greater than these values.

In addition, the value of Q/W (hereinafter referred to as Qp) is 2 kJ/g or more and 60 kJ/g as described above, but a lower limit value thereof is preferably 5 kJ/g or more, and an upper limit value thereof is preferably 40 kJ/g or less. By setting the Qp in this range, it is possible to perform construction with good construction efficiency (molding efficiency) while obtaining a desired structure form.

By setting the heat input amount Q and Qp to the ranges described above, the average interval of the secondary arms 5 in the dendrite can be set to 5 μm or less in the microstructure of the fluid contact portion 1 to be manufactured. That is, the compound phase 3 can be formed with a small fine structure at the intervals of the secondary arms 5 of the dendrite. Accordingly, the compound phase 3 such as eutectic carbide can be finely dispersed. In addition, it is preferable to increase the heat input amount Q and decrease Qp within the ranges of the heat input amount Q and the Qp. In this way, a molding volume in one pass can be increased, and the fluid contact portion 1 can be manufactured with a small number of laminations when a volume of the fluid contact portion 1 is large.

In addition, during lamination molding, the molding may be repeated by setting the heat input amount Q and Qp to be the same, or the molding may be repeated by changing at least a part thereof. By setting the heat input amount Q and Qp to different conditions, inclined structures in which the intervals of the secondary arms 5 of dendrite are different can be formed. Accordingly, the corrosion resistance of the surface in contact with the fluid is particularly excellent when the heat input amount Q is small and the Qp is large, and the manufacturing efficiency can be improved by manufacturing parts other than the surface under conditions with good molding efficiency.

According to the manufacturing device 100, the average interval of the secondary arms 5 in the dendrite in the cobalt-based alloy phase 2 can be set to 5 μm or less. Accordingly, the fluid contact member 10 including the fluid contact portion 1 having particularly excellent corrosion resistance can be manufactured.

Returning to FIG. 11, the cooling step S7 is a step of performing cooling at a speed, at which a heat dissipation speed from the substrate 101 to the outside is slower than a natural cooling speed, after all of the construction in the melting step S5 is finished. The cooling can be performed until a temperature of the substrate 101 reaches, for example, about a room temperature (25° C.). By the cooling step S7 of performing cooling at a speed slower than the natural cooling speed, cracking of the fluid contact portion 1 can be suppressed during cooling.

The cooling at a speed slower than the natural cooling speed can be performed by, for example, controlling ambient temperature of the fluid contact member 10, or by bringing a heat dissipation suppressing member for suppressing the heat dissipation from the substrate 101 to the outside into contact with the substrate 101. By performing the cooling by the contact of the heat dissipation suppressing member, the cooling can be performed by a simple method regardless of a size of the fluid contact portion 1. The heat dissipation suppressing member is, for example, a heat insulating material and a heat reserving material. As a form of the contact, for example, the heat dissipation suppressing member can be wound around the substrate 101.

When at least one of the temperature of the substrate 101 and the inter-pass temperature is controlled in the melting step S5, a cooling speed may be controlled using a heating device (for example, a ribbon heater 440 to be described later) used for the above control. Specifically, for example, the heating device includes a heat reserving material in order to promote normal heating. Therefore, when the temperature is controlled by bringing a heating device including such a heat reserving material into contact with the substrate 101, the cooling speed of the substrate 101 can be set to be equal to or lower than the natural cooling speed by performing cooling while keeping the heat reserving material in contact with the substrate 101.

The heat treatment step S8 is a step of performing heat treatment at a temperature of 200° C. or more and 700° C. or less after the melting step S5. In the manufactured fluid contact portion 1, the corrosion resistance and the wear resistance of the compound phase 3 formed in the dendrite arm spaces in the cobalt-based alloy phase 2 are lower than the corrosion resistance and the wear resistance of the dendrite arm spaces in the cobalt-based alloy phase 2. In particular, residual stress tends to remain in the lamination molding, and performance deterioration due to low corrosion resistance and wear resistance tends to occur. Therefore, in the heat treatment step S8, the residual stress is relaxed. By relaxing the residual stress, the possibility of occurring cracking during use of the fluid contact member 10 can be suppressed.

After the residual stress is relaxed in the heat treatment step S8, finishing such as rubbing is performed (the finishing step S9). Then, it is confirmed by, for example, a non-destructive inspection that there is no defect in the fluid contact portion 1 (the inspection step S10), and the fluid contact member 10 is obtained.

According to the manufacturing method of the invention, the average interval of the secondary arms 5 in the dendrite in the cobalt-based alloy phase 2 can be set to 5 μm or less. Accordingly, the fluid contact member 10 including the fluid contact portion 1 having particularly excellent corrosion resistance can be manufactured.

FIG. 13 is a diagram showing another device 200 of manufacturing the fluid contact member 10. In the manufacturing device 100, the melting in the melting step S5 is performed by an additive manufacturing technique using a powder containing the raw material 108. However, in the manufacturing device 200, the melting in the melting step S5 is performed by an additive manufacturing technique using a wire rod containing the raw material 108. A raw material 108 containing both a powdery material and a wire rod may be used as the raw material 108. That is, the melting can be performed by an additive manufacturing technique using at least one of the powder containing the raw material 108 and the wire rod containing the raw material 108.

The manufacturing device 200 includes a shield nozzle 125 having a shape narrowing toward the substrate 101. The shield nozzle 125 is disposed concentrically around the laser light 107. Inside the shield nozzle 125, a shield gas (for example, argon) flows toward the substrate 101.

In addition, the manufacturing device 200 includes a raw material supply nozzle 126 for supplying a wire rod containing the raw material 108 within a laser emission diameter formed by the laser light 107. By supplying the wire rod containing the raw material 108 through the raw material supply nozzle 126, the fluid contact portion 1 is formed in a shape of the substrate 101. The powder raw material 108 instead of the wire rod containing the raw material 108 or together with the wire rod containing the raw material 108 may be supplied from the raw material supply nozzle 126.

According to the manufacturing device 200, the average interval of the secondary arms 5 in the dendrite in the cobalt-based alloy phase 2 can be set to 5 μm or less. Accordingly, the fluid contact member 10 including the fluid contact portion 1 having particularly excellent corrosion resistance can be manufactured.

EMBODIMENTS

Hereinafter, the invention will be described in more detail with reference to embodiments. A fluid contact member was produced, and performance including corrosion resistance was evaluated.

Example 1

First, as Example 1, the fluid contact member 10 imitating the valve disc 83 (see FIG. 9 or the like) was produced using a manufacturing device 300 shown in FIG. 14, and the performance of the produced fluid contact member 10 was evaluated.

FIG. 14 is a diagram showing the manufacturing device 300 used in Example 1. The substrate 101 to be constructed was disposed on a high-frequency heating coil 340. The substrate 101 had a cylindrical shape with a diameter of 200 mm and a thickness of 80 mm, and was made of carbon steel. Then, a ring-shaped fluid contact portion 1 was lamination-molded on the substrate 101 by using the manufacturing device 100 (see FIG. 12). The fluid contact member 10 including the fluid contact portion 1 was manufactured by the lamination molding of the fluid contact portion 1.

The raw material 108 (powder) was supplied to the manufacturing device 100 from a powder supply machine 360 through a hose 361 together with argon gas. Compositions of the raw material 108 for forming the fluid contact portion 1 were set to contain 1.09% by mass of carbon, 29.0% by mass of chromium, 4.42% by mass of tungsten, 0.98% by mass of nickel, 0.46% by mass of iron, 0.18% by mass of molybdenum, and cobalt and inevitable impurities as balance.

The laser light 107 (see FIG. 12) emitted from the manufacturing device 100 was guided from a laser oscillator 330 to the laser head (not shown) of the manufacturing device 100 through a process fiber 331. The guided laser light 107 was emitted to the raw material 108 on the surface of the substrate 101 through a collimation lens and a condensing lens (both not shown) of the manufacturing device 100.

The nozzle 115 and the laser head for emitting the laser light 107 were attached to a three-axis NC processing machine, and coordinates and a scanning speed were controlled. The inter-pass temperature was fed back while measuring the temperature of the substrate 101 with a radiation thermometer, and the output of a high-frequency power supply 341 was controlled. The inter-pass temperature was controlled to 300° C. to 350° C. As the emission conditions of the laser light 107, the laser light output and the scanning speed were controlled such that the heat input amount Q is 3.6 kJ/cm and Qp (=Q/W) is 10.0 kJ/g.

The lamination molding was performed by molding passes shown in FIGS. 15A and 15B. The molding passes will be described with reference to FIGS. 15A and 15B.

FIG. 15A is a diagram showing a molding pass in Example 1. In an orthogonal coordinate system including an X axis and a Y axis, the laser light 107 was emitted, from a negative direction of the X axis, continuously in a circular shape counterclockwise by 360 degrees around an origin. The emission of the laser light 107 was performed at eight places at equal intervals in a radial direction. The laser light 107 emitted in the negative direction of the X axis was formed in a circular shape due to the movement of the laser head (not shown). Specifically, the laser light 107 is emitted starting from the negative direction of the X axis, crosses a negative direction of the Y axis, a positive direction of the X axis, and a positive direction of the Y axis, and reaches the starting point on the negative direction of the X axis again.

FIG. 15B is a diagram showing a molding pass in Example 1. In FIG. 15A, when the emission position of the laser light 107 reaches the negative direction of the X axis again, the emission of the laser light 107 is temporarily stopped. Then, after the laser head (not shown) for emitting the laser light 107 moves to the positive direction of the X axis, the emission of the laser light 107 starting from the positive direction of the X axis is started. Similar to FIG. 15A, in an emission direction of the laser light 107, the laser light 107 was emitted continuously in a circular shape counterclockwise by 360 degrees around the origin. The emission of the laser light 107 was performed at eight places at equal intervals in the radial direction so as to trace the emission position in FIG. 15A.

Then, the lamination molding was performed by repeating a total of eight sets of the molding passes with the modeling passes shown in FIGS. 15A and 15B as one set, and the fluid contact member 10 including the ring-shaped fluid contact portion 1 was produced.

After the fluid contact member 10 was manufactured and cooled to the room temperature, the heat treatment step S8 was performed by performing heat treatment at 650° C. for 2 hours. After the heat treatment step S8, natural cooling was performed again to room temperature.

In addition, as Comparative Example 1, a fluid contact member was produced by using gas welding using acetylene, using the same raw material 108 as in Example 1. Further, as Comparative Example 2, a fluid contact member was produced by TIG welding by using the same raw material 108 as that in Example 1. In Comparative Examples 1 and 2, both the heat input amount and the Qp are out of the numerical ranges described in the description of the "manufacturing method of the invention".

When appearances of the formed fluid contact portions of Example 1, Comparative Example 1, and Comparative Example were visually observed and observed with an optical microscope, no defect such as pinholes and voids was recognized in Example 1. In addition, when the fluid contact portion 1 of Example 1 was subjected to an internal defect inspection by an ultrasonic flaw detection test, no defect instruction was confirmed. On the other hand, when the ultrasonic flaw detection test was performed on the fluid contact portions of Comparative Examples 1 and 2 in the same manner as on that in Example 1, echoes were disturbed due to the influence of a coarse compound phase, and the ultrasonic flaw detection was impossible.

Cross-sectional structures of the formed fluid contact portions of Example 1, Comparative Example 1, and Comparative Example 2 were observed with an optical microscope. A cross section of Example 1 observed by an optical microscope is shown in FIGS. 1 to 4, a cross section of Comparative Example 1 is shown in FIG. 6, and a cross section of Comparative Example 2 is shown in FIG. 7. In Example 1, the average interval of the secondary arms 5 was 2.7 μm. On the other hand, in Comparative Example 1, the average interval of the secondary arms 5 was very large, and was 17 μm or more. Further, in Comparative Example 2 produced by TIG welding in which the heat input amount is relatively small, the average interval of the secondary arms 5 was also 9.95 μm or more. Therefore, according to Example 1 of the manufacturing method of the invention, the average interval of the secondary arms 5 of the dendrite in the cobalt-based alloy phase 2 can be set to 5 μm or less.

In addition, Vickers hardness was measured for each of the formed fluid contact portions of Example 1, Comparative Example 1, and Comparative Example 2 based on JIS Z 2244: 2009. The measurement was performed on the fluid contact portion formed on the substrate by using the produced fluid contact member. As a result, in Example 1, the Vickers hardness was 510 HV. On the other hand, the Vickers hardness was 425 HV in Comparative Example 1 and 435 HV in Comparative Example 2. Therefore, according to the invention in which the average interval of the secondary arms 5 of the dendrites is 5 μm or less, the Vickers hardness can be improved as compared with Comparative Examples 1 and 2. Therefore, according to the invention, a fluid contact member having excellent wear resistance can be manufactured.

Further, a Charpy impact test (with a notch) was performed on each of the formed fluid contact portions of Example 1, Comparative Example 1, and Comparative Example 2 based on JIS Z 2242: 2005. The measurement was performed on the fluid contact portion formed on the substrate by using the produced fluid contact member. The Charpy impact test was performed three times at room temperature (25° C.). As a result, in Example 1, an average value of three times was 11.5 J/cm. On the other hand, an average value was 3.6 J/cm in Comparative Example 1 and Comparative Example 2.

In addition, the Charpy impact test was performed in the same manner except that a test piece without a notch was used. As a result, in Example 1, an average value of three times was 60 J/cm. On the other hand, an average value was 11.8 J/cm in Comparative Example 1. In addition, although the test was not performed in Comparative Example 2, since the results of Comparative Example 1 and Comparative Example 2 were the same in the test with a notch, it is considered that the result was also the same as the result (11.8 J/cm) of Comparative Example 1 in the case of using a test piece without a notch.

Therefore, according to the invention in which the average interval of the secondary arms 5 of the dendrite in the cobalt-based alloy phase 2 is 5 μm or less, the Charpy impact strength can be improved as compared with those of Comparative Examples 1 and 2. Therefore, according to the invention, a fluid contact member excellent in impact resistance can be manufactured. In particular, since Example 1 with a notch and Comparative Example 1 without a notch had almost the same value, even if the surface of the fluid contact portion 1 was scratched and the impact resistance was reduced, the fluid contact portion 1 can have at least the same impact resistance as that in the related art without a scratch.

Then, the corrosion resistance of each of the produced fluid contact members of Example 1, Comparative Example 1, and Comparative Example 2 was evaluated. That is, each of the fluid contact members was immersed in high temperature water of 288° C. for 1500 hours, and a corrosion test was performed. After 1500 hours, each of the fluid contact members was taken out from the high temperature water, and a cross section of each of the microstructures was observed with an optical microscope.

As a result of the observation, a maximum erosion depth in the fluid contact portion of Example 1 was about 5 μm. On the other hand, a maximum erosion depth in the fluid contact portion of Comparative Example 1 was about 60 μm, and a maximum erosion depth in the fluid contact portion of Comparative Example 2 was about 25 μm. Therefore, according to the invention in which the average interval of the secondary arms 5 of the dendrite in the cobalt-based alloy phase 2 was 5 μm or less, the maximum erosion depth can be reduced as compared with those of Comparative Examples 1 and 2. Therefore, according to the invention, the fluid contact member 10 excellent in corrosion resistance can be manufactured.

In addition, apart of each of the produced fluid contact portions of Example 1, Comparative Example 1, and Comparative Example 2 was collected to produce each reduced fracture toughness test piece. A fracture toughness test was performed using each of the produced reduced fracture toughness test pieces based on JIS G 0564: 1999. As a result of the test, $K_{1C}$ in Example 1 was 41.5 MPa·m$^{1/2}$. On the other hand, $K_{1C}$ in Comparative Example 1 was 11 MPa·m$^{1/2}$. In addition, although the test in Comparative Example 2 was not performed, since the same results were obtained in the Vickers hardness test and the Charpy impact test in Comparative Examples 1 and 2, it is considered that fracture toughness of Comparative Example 2 is the same as that of Comparative Example 1. Therefore, according to the invention in which the average interval of the secondary arms 5 of the dendrite in the cobalt-based alloy phase 2 is 5 μm or less, the fracture toughness can be improved as compared with those of Comparative Examples 1 and 2. Therefore, according to the invention, the fluid contact member 10 which is hard to break even when a large load is applied and has excellent reliability can be manufactured.

Overview of Example 1

As described above, in Example 1, the fluid contact member 10 excellent in various performances including the corrosion resistance can be manufactured. Therefore, by setting the average interval of the secondary arms 5 to 5 μm or less, the fluid contact member 10 including the fluid contact portion 1 particularly excellent in the corrosion resistance can be manufactured.

Example 2

The effect of relaxing residual stress generated depending on the presence or absence in the heat treatment step S8 was evaluated by manufacturing the fluid contact member 10 of Example 2 using a manufacturing device 400 shown in FIG. 16.

FIG. 16 is a diagram showing a manufacturing device 400 used in Example 2. The manufacturing device 400 includes a ribbon heater 440 that covers a side surface of the substrate 101 and a power supply 441 for the ribbon heater 440 instead of including the high-frequency heating coil 340 and the high-frequency power supply 341 (see FIG. 14). The ribbon heater 440 is disposed so as to cover an entire circumference of the substrate 101. The inter-pass temperature was fed back while measuring the temperature of the substrate 101 with a thermocouple (not shown), and output of the power supply 441 was controlled. The inter-pass temperature was the same as that in Example 1. Then, the melting step S5 and the heat treatment step S8 were performed in the same manner as those in Example 1 to produce the ring-shaped fluid contact member 10 including the fluid contact portion 1.

FIG. 17A is a perspective view of the substrate 101 on which the fluid contact portion 1 is formed in Example 2. After the heat treatment step S8, eight strain gauges 70 were attached to the fluid contact portion 1 at equal intervals in a circumferential direction. The tensile residual stress of the fluid contact portion 1 was measured by the strain gauges 70. The strain gauge 70 will be described with reference to FIG. 17B.

FIG. 17B is an enlarged view of a part G in FIG. 17A. The strain gauge 70 can perform 3-axis rosette analysis, and is capable of measuring strain (resistance change) in three directions constituted by a first axis, a second axis extending in a direction perpendicular to the first axis, and a third axis having an angle of 45 degrees with respect to the first axis.

The tensile residual stress is measured by cut-releasing using the eight strain gauges 70. As a result, a residual stress was 200 MPa or less in both a radial direction and the circumferential direction of the fluid contact portion 1. On the other hand, a tensile residual stress of the fluid contact portion 1 in the fluid contact member 10 produced in the same manner as that in Example 2 except that the heat treatment step S8 was not performed was about 750 MPa to 800 MPa in both the radial direction and the circumferential direction. Therefore, the tensile residual stress was significantly reduced by the heat treatment step S8.

REFERENCE SIGN LIST

1 fluid contact portion
10 fluid contact member
100 manufacturing device
101 substrate
105 inner nozzle
106 outer nozzle
107 laser light
108 raw material
111 fluid contact portion
115 nozzle
125 shield nozzle
126 raw material supply nozzle
2 cobalt-based alloy phase
20 valve
200 manufacturing device
21 cobalt-based alloy phase
3 compound phase
300 manufacturing device
330 laser oscillator
331 process fiber
340 high-frequency heating coil
341 high-frequency power supply
360 powder supply machine
361 hose
4 primary arm
400 manufacturing device
440 ribbon heater
441 power supply
5 secondary arm
70 strain gauge
81 valve rod
82 valve body
83 valve disc (fluid contact member)
84 contact portion (fluid contact portion)
85 valve seat main body portion (substrate)
86 valve seat (fluid contact member)
87 contact portion (fluid contact portion)
88 valve disc main body portion (substrate)
11 center line
12 center line

The invention claimed is:

1. A fluid contact member, comprising:
a fluid contact portion configured to be in contact with a fluid; wherein
the fluid contact portion has a cobalt-based alloy phase having a dendrite, and
a compound phase formed in an arm space of the dendrite and containing chromium carbide, and
among a plurality of secondary arms extending from one primary arm constituting the dendrite, an average interval between adjacent secondary arms is 5 μm or less.

2. The fluid contact member according to claim 1, wherein the average interval is 3 μm or less.

3. The fluid contact member according to claim 1, wherein the compound phase is discontinuously formed in the dendrite arm space.

4. The fluid contact member according to claim 1, wherein the fluid contact portion contains:
0.9% by mass or more of carbon,
26% by mass or more and 32% by mass or less of chromium,
0% by mass or more and 6% by mass or less of tungsten,
0% by mass or more and 1% by mass or less of nickel,
0% by mass or more and 1% by mass or less of iron,
0% by mass or more and 1% by mass or less of molybdenum, and
cobalt and inevitable impurities as balance.

5. The fluid contact member according to claim 1, wherein the fluid contact portion contains tungsten in a proportion of 3% by mass or more and 6% by mass or less.

6. The fluid contact member according to claim 1, further comprising:
a fluid contact member for a nuclear facility.

7. The fluid contact member according to claim 1, further comprising:
at least one of a valve disc and a valve seat.

* * * * *